US008234377B2

(12) United States Patent
Cohn

(10) Patent No.: US 8,234,377 B2
(45) Date of Patent: Jul. 31, 2012

(54) DYNAMICALLY MIGRATING COMPUTER NETWORKS

(75) Inventor: Daniel T. Cohn, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 230 days.

(21) Appl. No.: 12/507,742

(22) Filed: Jul. 22, 2009

(65) Prior Publication Data
US 2011/0022711 A1   Jan. 27, 2011

(51) Int. Cl.
*G04F 15/173* (2006.01)
(52) U.S. Cl. ......... 709/225; 709/223; 709/238; 709/245
(58) Field of Classification Search .................. 709/203, 709/218, 219, 220, 221, 223, 224, 238, 239, 709/242, 244, 245, 249
See application file for complete search history.

(56) References Cited

U.S. PATENT DOCUMENTS

| | | | |
|---|---|---|---|
| 7,746,873 B2* | 6/2010 | Saito et al. | 370/400 |
| 7,865,586 B2* | 1/2011 | Cohn | 709/223 |
| 2006/0123079 A1* | 6/2006 | Sturniolo et al. | 709/203 |
| 2007/0260733 A1 | 11/2007 | Havemose et al. | |
| 2008/0059639 A1 | 3/2008 | Zhang | |
| 2008/0104273 A1* | 5/2008 | Bruck et al. | 709/238 |
| 2009/0125904 A1 | 5/2009 | Nelson | |
| 2009/0248896 A1* | 10/2009 | Cohn | 709/245 |

OTHER PUBLICATIONS

Open Virtualization Format, retrieved on Apr. 21, 2009, from http://www.vmware.com/appliances/learn/ovf.html, 1 page.
The Open Virtual Machine Format—Whitepaper for OVF Specification, v0.9, 2007, retrieved on May 28, 2009, from http://www.vmware.com/pdf/ovf_whitepaper_specification.pdf, 16 pages.
Open Virtualization Format White Paper, v.1.0.0, Feb. 6, 2009, retrieved on May 28, 2009, from http://www.dmtf.org/standards/published_documents/DSP2017_1.0.0.pdf, 39 pages.
Cohesive Flexible Technologies—VcubeV, retrieved Dec. 9, 2008, from http://www.cohesiveft.com/Developer/, 1 page.
Cohesive Flexible Technologies—VPN-Cubed, retrieved Dec. 9, 2008, from http://www.cohesiveft.com/vpncubed/, 2 pages.
CohesiveFT Elastic Server: VPN-Cubed: Technical Overview, retrieved Dec. 9, 2008, from http://blog.elasticserver.com/2008/12/vpn-cubed-technical-overview.html, 4 pages.

(Continued)

*Primary Examiner* — Barbara Burgess
(74) *Attorney, Agent, or Firm* — Seed Intellectual Property Law Group PLLC

(57) ABSTRACT

Techniques are described for providing capabilities to dynamically migrate computing nodes between two or more computer networks while the computer networks are in use, such as to dynamically and incrementally migrate an entire originating first computer network to a destination second computer network at a remote location. For example, the first computer network may include one or more physically connected computer networks, while the second computer network may be a virtual computer network at a remote geographical location (e.g., under control of a network-accessible service available to remote users). The provided capabilities may further include facilitating the ongoing operations of the originating first computer network while a subset of the first computer network computing nodes have been migrated to the remote destination second computer network, such as by forwarding communications between the first and second computer networks in a manner that is transparent to the various computing nodes.

29 Claims, 8 Drawing Sheets

OTHER PUBLICATIONS

Cohesive Flexible Technologies—CohesiveFT FAQ, retrieved Dec. 9, 2008, from http://www.cohesiveft.com/FAQ/, 10 pages.

Enomalism: Elastic Computing Platform—Virtual Server Management: Home—True Elastic Computing, retrieved Aug. 26, 2008, from http://www.enomalism.com/, 2 pages.

Enomalism: Elastic Computing Platform—Virtual Server Management: Home—Open Source Cloud Computing, retrieved Aug. 26, 2008, from http://www.enomalism.com/, 2 pages.

Cohen, R., "ElasticVapor :: Life in the Cloud—Virtual Private Cloud (VPC)," Thursday, May 8, 2008, retrieved Aug. 26, 2008, from http://elasticvapor.com/search/label/Virtualization, 6 pages.

Internetworking Technology Handbook—Data-Link Switching, retrieved Jul. 22, 2009, from http://cisco.com/en/US/docs/internetworking/technology/handbook/DLSw.html, 7 pages.

Data-Link Switching—Wikipedia, retrieved on May 19, 2009, from http://en.wikipedia.org/wiki/DLSw, 1 page.

\* cited by examiner

DYNAMICALLY MIGRATING COMPUTER NETWORKS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies, such as those provided by VMWare, XEN, Linux's KVM ("Kernel-based Virtual Machine"), or User-Mode Linux, may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

DETAILED DESCRIPTION

Figure 1A:
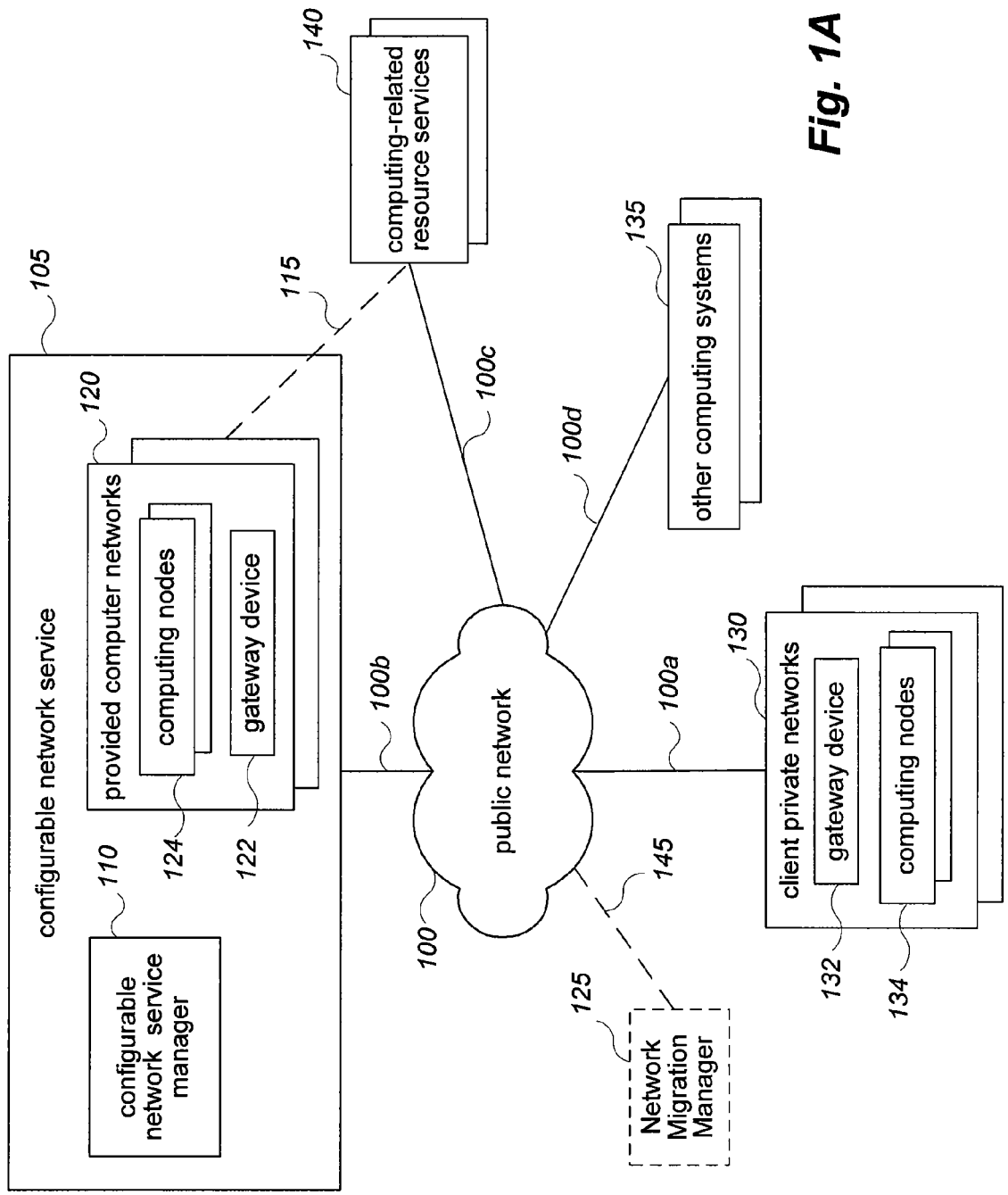
FIGS. 1A and 1B are network diagrams illustrating example embodiments of interactions that involve dynamically migrating computer network computing nodes.

Techniques are described for providing capabilities to facilitate dynamic migration of computing nodes between computer networks while the computer networks are in use, such as on behalf of a user or other entity associated with the computer networks. In at least some embodiments, the provided capabilities include facilitating the dynamic migration of an entire first computer network to a remote location while the first computer network is in use, such as with each of multiple computing nodes of the first computer network being incrementally migrated to a distinct computing node that is part of a destination second computer network at the remote location. In addition, in at least some such embodiments, the provided capabilities further include facilitating the ongoing operations of an originating first computer network while a subset of the first computer network computing nodes have been migrated to the remote destination second computer network, such as by forwarding communications between the first and second computer networks in a manner that is transparent to the various computer network computing nodes (e.g., such that the migration of a particular computing node of the first computer network is transparent to the other computing nodes of the first computer network, such that the other computing nodes may continue to send communications between themselves, and in some cases may also continue to send communications to the computing node being migrated). Furthermore, in at least some embodiments, one of the first and second computer networks may be a physically connected computer network (e.g., a LAN, or local area network) in a first geographical location, while the other of the first and second computer networks may be a virtual computer network provided at a remote second geographical location (e.g., under the control of a network-accessible service available to remote users), such as if the originating first computer network is a physically connected computer network under control of a first entity, and the destination second computer network is a remote virtual computer network provided to the first entity by a fee-based network-accessible service of which the first entity is a customer. Additional details related to the various provided capabilities for dynamically migrating computer network computing nodes are discussed below. In addition, in at least some embodiments, some or all of the described techniques are automatically performed by an embodiment of a Network Migration Manager ("NMM") module, as described in greater detail below.

As noted above, in at least some embodiments, an embodiment of an NMM module automatically facilitates the dynamic migration of some or all computing nodes of an originating first computer network to a distinct destination second computer network, such as to a destination virtual computer network that is remote from the originating computer network. In some such embodiments, the NMM module may be integrated with or otherwise associated with the destination second computer network, such as if the NMM module is part of a network-accessible service that also provides virtual computer networks for use by clients, with the destination second computer network being one of the provided virtual computer networks. In other embodiments, the NMM module may instead be integrated with or otherwise associated with the originating first computer network (e.g., if the first computer network is a virtual computer network provided by such a network-accessible service), or may not be associated with either of the originating and destination computer networks (e.g., if the NMM module is part of a distinct service that provides capabilities to facilitate dynamic computer network migrations).

In addition, in at least some embodiments, the facilitating of the dynamic migration of some or all computing nodes of an originating first computer network to a distinct destination second computer network while the first computer network is in use includes managing interactions between the first and second computer networks during the dynamic migration. In particular, gateway devices on one or both of the first and second computer networks may be configured to maintain a connection between the first and second computer networks (e.g., a private and/or secure connection, such as a VPN connection), and to manage interactions between the first and second computer networks. For example, if a sending computing node on a first computer network initiates a network communication to an intended destination computing node that was previously part of the first computer network but that has been migrated to a distinct replacement computing node on a second computer network, gateway devices on the first and second computer networks may interact to forward the communication to the replacement computing node on the second computer network in a manner that is transparent to the sending computing node and the destination replacement computing node. Similarly, any response communication sent back by the replacement computing node will be forwarded in a reverse manner back to the sending computing node on the first computer network via the gateway device(s) in such a manner that the forwarded response communication appears to come from the original intended destination computing node as part of the first computer network. In this manner, a software program executing on a migrated replacement computing node on the second computer network may be unaware that the replacement computing node is no longer physically attached to the first computer network. As one illustrative example, such gateway devices may each be part of and support a local area network (e.g., a physical or virtual local area network that generally manages communications as part of a single broadcast domain using networking layer 2 protocols), with the gateway device on a first such local area network representing a remote computing node on another second local area network by spoofing the hardware address (e.g., a MAC, or Media Access Control, address) of the remote computing node for the first local area network so as to receive and handle communications from the first local area network that are directed to the remote computing node. In addition, gateway devices may be further configured to perform other operations in other situations as part of facilitating the dynamic migration of computer network computing nodes (e.g., to respond to ping requests, SNMP ("Simple Network Management Protocol") queries, etc.).

As an illustrative example with additional details regarding operation of such gateway devices in one embodiment, consider a situation in which a first computing node of an originating first local area computer network is migrated to a remote destination second computer network that is configured to operate as an extension to the first computer network, with the migration such that a distinct second computing node of the second computer network replaces the first computing node as part of the first local area computer network and begins to use a first network address (e.g., an IP, or Internet Protocol, address) for the first computer network that was previously used by the first computing node. As part of facilitating the dynamic migration of the first computing node to the second computing node, a first gateway device that is part of the first computer network may be configured to represent the remote second computing node to other computing nodes on the first computer network, such as by the first gateway device associating itself with the first network address on the first computer network. For example, the first gateway device may issue a gratuitous ARP ("Address Resolution Protocol") message that includes the first network address, or may otherwise update other devices on the first computer network to forward communications intended for the first network address to the first gateway device. When another computing node on the first computer network subsequently sends a communication to the first network address that is intended for the first computing node, the communication will then be directed over the first computer network to the first gateway device. The first gateway device may then forward the communication to the remote second computer network for delivery to the second computing node in lieu of the migrated first computing node, such as in a manner similar to that of a router. Such communication forwarding may be facilitated by a second gateway device on the second computer network that receives the forwarded communication from the first gateway device, and further forwards the communication over the second computer network. Moreover, in at least some embodiments, the first and second gateway devices may forward the communication in a manner that is transparent to the computing nodes of the first and second computer networks, such as by not modifying the forwarded communication in the same manner as would be done by a router device (e.g., not modifying a time-to-live hop value for the communication), by sending the forwarded communication over the second computer network using spoofed information for the sender network address and/or sender hardware address that corresponds to the sending computing node and the first computer network, etc. In this manner, the forwarded communication appears to the second computing node as if it comes from the sending computing node via a single local area computer network to which both computing nodes belong.

In addition, the migration of a computing node from an originating first computer network to a remote destination second computer network may be performed in various manners in various embodiments. For example, in some embodiments, the second computer network may be a physical computer network that is configured before the migration to include one or more computing nodes that are each available to replace one or more computing nodes of the first computer network, such as if the one or more computing nodes of the second computer network are not otherwise in use until such migrations occur. In other embodiments, the second computer network may be a virtual computer network to which computing nodes may be dynamically added at a time of the migration of the first computer network computing node, such as if the virtual computer network is provided by a network-accessible service that provides a large number of available computing nodes for use in virtual computer networks provided to clients. In addition, in some embodiments and situations, the migration of a computing node may include moving some or all of the software programs executing on the computing node and/or the data used by the executing software programs to a new physical computing system in a different geographical location (e.g., by executing distinct copies of those software programs on the new computing system, by copying data to the new computing system, etc.), such that the new physical computing system acts as the same logical computing node after the migration is completed, while in other embodiments the computing node to be migrated may be physically moved to the different geographical location and attached to the new computer network. In addition, when a computing node migration involves use of a new computing system at a different location, the new computing system may in some embodiments be configured to operate as the replacement computing node for the computing node being migrated before the NMM module initiates any changes to facilitate the migration (e.g., any changes to gateway devices involving forwarding communications), such that the configured gateway devices may begin forwarding communications to the replacement computing node in an immediate or substantially immediate manner. In other embodiments and situations, the replacement computing node may be unavailable for a period of time (e.g., seconds, minutes, hours, etc.) after the migration is initiated, and if so the gateway devices may perform one or more types of actions to facilitate the migration (e.g., queue communications sent to the computing node being migrated until the replacement computing node is ready to receive them, issue an error to indicate that the communication was not delivered so as to trigger a later re-sending of the communication, etc.).

Furthermore, determinations may be made in various ways of particular computing nodes to migrate. For example, in some embodiments, a user associated with the originating computer network from which computing nodes are being migrated may select particular computing nodes to migrate and then notify the NMM module of the selection, and may further in some such embodiments manually perform the actions involved in the computing node migration (e.g., before informing the NMM module of the selection). In other embodiments, the NMM module may participate in the automated selection of computing nodes to migrate and/or in the automated migration of selected computing nodes (e.g., by provisioning the replacement computing node, executing software programs, copying data, etc.). For example, in at least some embodiments, the user and/or the NMM module may define criteria for use in evaluating and selecting particular computing nodes to migrate (e.g., to select a subset of computing nodes to migrate, to select an order in which some or all of the computing nodes will be migrated, etc.). Such defined criteria may be based, for example, on current status or other characteristics of the computing node selected for migration and/or of a distinct computing node to be used as the replacement computing node for the migrated computing node, such as by using user-specified and/or automatically learned thresholds or other types of constraints (e.g., to identify computing nodes that are over-utilized or under-utilized in one or more areas). In addition, such criteria may be related to one or more of a variety of factors, including operational metrics of the current computing nodes and/or other factors. For example, a non-exclusive list of factors that an NMM module may use in its defined criteria include one or more of the following: degree of availability of each computing node; volume of requests being received by and/or handled by each computing node; degree of network utilization for each computing node; degree of network latency for each computing node; degree of latency in responding to requests for each computing node; degree of processor utilization for each computing node; degree of memory utilization for each computing node; degree of I/O ("input/output") bandwidth utilization for each computing node; a number of other computing nodes (or software applications of those computing nodes) that are currently interacting with or otherwise using each computing node; a financial cost associated with using one or more computing nodes for one or more activities at a current time and/or future time; a non-financial cost associated with using one or more computing nodes for one or more activities at a current time and/or future time (e.g., an environmental cost, which may be represented in financial terms); a user-specified predicted degree of current and/or future demand for one or more other of the factors for each computing node; an automatically learned or otherwise predicted degree of current and/or future demand for one or more other of the factors for each computing node; etc. In addition, an NMM module may gather or otherwise obtain current values for and other information about such metrics and other factors in various manners in various embodiments, such as by monitoring various computing node and network operation characteristics.

Determinations may be made to migrate particular computing nodes for various reasons and in various manners in various embodiments. For example, in some embodiments, a migration of a computing node may be initiated to obtain an enhanced level of services or capabilities that will be provided by the replacement computing node and/or the destination computer network to which the replacement computing node belongs, such as for a fee. As one example, the destination computer network may in some embodiments provide differentiated capabilities, such as different levels of quality-of-service or different types of capabilities on different computing nodes (e.g., for a fee), and a particular replacement computing node may be selected based on such capabilities of the replacement computing node (e.g., based on a user request or selection, based on an automatic suggestion by the NMM module to a user or other entity associated with originating computer network, etc.). In other embodiments, computing nodes may be migrated as part of the migration of an entire originating computer network, and an order of the computing nodes to be migrated may be selected in other manners (e.g., in a random manner, by an associated user based on business considerations, etc.).

As previously noted, an NMM module may be configured to facilitate the dynamic migration of some or all computing nodes of an originating first computer network by using a remote computer network or other computing nodes provided by a remote network-accessible service. In order to obtain access to such a remote computer network or other remote computing nodes, in at least some embodiments, a user (or the NMM module on behalf of a user) may interact over public networks with a remote network-accessible service that allows the user to configure a computer network that the service provides on behalf of the user, with the configured computer network including multiple computing nodes that are maintained by or otherwise under the control of the network-accessible service. After configuring such a computer network, the user and/or the NMM module may interact from one or more remote locations with the computer network being provided by the network-accessible service, such as to execute programs on the computing nodes of the provided computer network, to dynamically add additional computing nodes to the provided computer network, etc. In at least some embodiments, at least some of the computer networks provided by the network-accessible service may be private computer networks that are each accessible only by the user of the network-accessible service on whose behalf the provided computer network is created and configured (or by others for whom access is explicitly configured). For example, the network-accessible service may provide a user who is a client of the network-accessible service with private access to a computer network provided for the client, such as by enabling a secure VPN ("virtual private network") connection or other private connection between one or more remote computing systems of the client and the provided computer network, or may use other security and/or authentication techniques to enable the client to remotely interact with the provided computer network in a private and/or secure manner. In addition, in at least some embodiments, at least some of the computer networks provided by the network-accessible service are each created and configured by a client to be an extension to an existing computer network of the client, such as a private computer network extension to an existing remote private computer network of the client (e.g., a remote corporate network of a client that is a corporate entity). Furthermore, in at least some embodiments and situations, the computer networks provided by the network-accessible service may be virtual computer networks, while in other embodiments the provided computer networks may be physically connected computer networks. Additional details related to establishing and using a remote computer network provided by a network-accessible service are included below.

The use of the described techniques for implementing the various provided capabilities produces a variety of benefits in a variety of situations. For example, in some situations, a user or other entity may maintain one or more physical networks with multiple computing nodes in one or more geographical locations, but need to temporarily migrate some or all of those computing nodes to a remote location (e.g., in order to perform maintenance or upgrades), and then to reverse the migration back to the one or more physical networks after the temporary period has ended. In other situations, a user or other entity may instead desire to permanently migrate some or all computing nodes of one or more physical networks in one or more geographical locations to a remote location (e.g., to obtain advantages in cost and/or capabilities). Furthermore, the temporary or permanent migration of some or all computing nodes of one or more physical networks in one or more geographical locations to a remote location may be performed in various manners, such as quickly (e.g., over the course of minutes or hours) or more gradually (e.g., over a period of days or weeks or months)—such migration may include repeatedly selecting one or more computing nodes of the physical network to be migrated, directing new communications that would otherwise have been sent to those selected computing nodes to instead be sent to corresponding replacement computing nodes of the remote virtual network, and optionally stopping use of the selected computing nodes immediately or after they have finished handling specified functions (e.g., ongoing sessions or other network interactions that they were involved with before they were selected to be migrated). It will be appreciated that the described techniques and provided capabilities may further be used in a variety of other manners.

FIG. 1A is a network diagram illustrating an example of situations in which the described techniques may be used to provide capabilities for facilitating the dynamic migration of computer network computing nodes between computer networks. In this example, the dynamic migration uses destination computer networks that are remote virtual computer networks from an example network-accessible service that provides client-configurable networks, such as remote virtual computer networks that are created and configured as network extensions to existing private computer networks of clients, although in other embodiments the dynamic migrations may be performed in other manners (e.g., by using other available computing nodes of a user, such as that are part of a distinct computer network).

In the illustrated example of FIG. 1A, an example configurable network service ("CNS") 105 provides functionality to clients (not shown) over one or more public networks 100 (e.g., over the Internet) that enables the clients to access and use virtual computer networks provided to the clients by the CNS 105, so that the remote clients may use the CNS 105 to dynamically modify and extend the capabilities of their remote existing private computer networks 130 to the new provided virtual computer networks 120 using cloud computing techniques over the public network 100. In addition, in the illustrated example, one or more NMM modules 125 further use the functionality provided by the CNS 105 to facilitate dynamic computer network computing node migration functionality, as described in greater detail below. Such dynamic computer network computing node migration functionality provided by the NMM modules 125 may be facilitated by the CNS 105 if, for example, the CNS 105 allows provided computer networks to be dynamically modified (e.g., to add or remove computing nodes from provided computer networks), if particular provided computer networks already include computing nodes that are available to be temporarily or permanently put into use as replacement computing nodes by an NMM Load Balancer module 125 as needed, etc.

In particular, in FIG. 1A, a number of clients interact over the public network 100 with a manager module 110 of the CNS 105 to create and configure various private computer network extensions 120 to remote existing client private networks 130, with at least some of the computer network extensions 120 being configured to enable private access from one or more corresponding client private networks 130 over the public network 100 (e.g., via VPN connections established over interconnections 100a and 100b, or via other types of private interconnections). In this example, each of the provided computer networks 120 include one or more computing nodes 124 (e.g., from a number of computing nodes provided by the CNS 105), and at least one computing device configured to act as a gateway device 122 to facilitate interactions with a corresponding remote client private network 130. Each of the example remote client private networks 130 similarly includes multiple computing nodes 134, as well as one or more gateway devices 132 that facilitate interactions with a corresponding provided computer network 120. Such gateway devices 132 may, for example, be added to the client private networks 130 at a time of establishing a corresponding provided computer network 120 as an extension to the client private network 130 (e.g., under control of the CNS 105 and/or a NMM module 125), or may instead be part of the client private network 130 previously (e.g., to manage other interactions of the computing nodes 134 with the public network 100) and configured to perform further interactions with the corresponding provided computer network 120. In addition, in this embodiment, the manager module 110 assists in providing functionality of the CNS 105 to the remote clients, such as in conjunction with various other modules (not shown) of the CNS 105 and various computing nodes and networking devices (not shown) that are used by the CNS 105 to provide the private computer network extensions 120. In at least some embodiments, the CNS manager module 110 may execute on one or more computing systems (not shown) of the CNS 105, and may provide one or more APIs ("application programming interfaces") that enable remote computing systems to programmatically interact with the module 110 to access some or all functionality of the CNS 105 on behalf of clients (e.g., to create, configure, and/or initiate use of private network extensions 120). In addition, in at least some embodiments, clients may instead manually interact with the module 110 (e.g., via a graphical user interface provided by the module 110) to perform some or all such actions.

Each of the NMM modules 125 may be associated with one or more of the client private networks 130, such as to facilitate dynamic and incremental migrations of one or more computing nodes 134 of those associated client private networks to one or more corresponding replacement computing nodes 124 of an associated provided computer network 120. As previously noted, when a computing node of one of the client private networks 130 is to be migrated to a replacement computing node on an associated provided computer network 120, the associated NMM module 125 may take various actions to facilitate the migration. For example, the NMM module 125 may configure the gateway devices 132 and 122 of the computer networks 130 and 120, respectively, to manage communications sent to the network address of the migrated computing node, such that the configured gateway device 132 will forward a communication from one of the computing nodes 134 to that network address to the configured gateway device 122 for further forwarding to the replacement computing node 124, while a communication from another of the computing nodes 124 to that network address will be forwarded directly to the replacement computing node 124 without any actions by the configured gateway devices 122 and 132.

Furthermore, in some embodiments, the NMM module 125 may automatically perform additional activities with respect to selecting the computing node 134 to be migrated and/or to performing the migration to the corresponding replacement node 124, such as by interacting with some or all of the computing nodes 134 to obtain current status information about their operations for use in selecting the computing node 134 to be migrated, and/or by interacting with the provided computer network 120 via the module 110 to add, provision and/or initiate operation of the replacement computing node 124. More generally, as part of facilitating the dynamic migration of some or all computing nodes 134 of a client private network 130 to a corresponding provided computer network 120, the NMM module 125 may further perform interactions with the CNS 105, such as one or more of the following: to initiate creation of the provided computer network 120 to be used as the destination computer network for the migration of computing nodes 134 from the client private network 130; to initiate the addition of one or more computing nodes to an existing provided computer network 120 for the client private network 130, such as to be used as replacement computing nodes; to initiate the use of one or more existing computing nodes of the existing provided computer network 120 as replacement computing nodes for the client private network 130; etc. In some embodiments, each migrated computing node 134 will be replaced by a distinct computing node 124, while in other embodiments a single computing node 124 may act as a replacement computing node for multiple migrated computing nodes 134 and/or a single migrated computing node 134 may have multiple corresponding replacement computing nodes 124.

In addition, in some embodiments, the NMM module(s) 125 may further facilitate dynamic migrations of computing nodes 124 of a provided computer network 120 to replacement computing nodes 134 of a client private network 130, whether as reverse migrations of computing nodes 124 that were temporarily migrated to the provided computer network 120 from the client private network 130, or as a permanent one-way migration from a virtual computer network 120 to a physically provided client network 130. Similarly, in some embodiments, the NMM module(s) 125 may further facilitate dynamic migrations of computing nodes 124 of a provided computer network 120 to replacement computing nodes 124 of another provided computer network 120, and/or dynamic migrations of computing nodes 134 of a client private computer network 130 to replacement computing nodes 134 of another client private computer network 130.

While the NMM modules 125 are illustrated in this example as optionally being accessible via the public network 100 via a connection 145, some or all of the NMM modules 125 may instead each be located as part of a particular associated client private network 130 and/or as part of the CNS 105. For example, an NMM module 125 that is part of a particular client private network 130 may be obtained and installed by an entity that provides that client private network, while an NMM Load Balancer module 125 that is provided by the CNS 105 may be configured to support one or more of the provided computer networks 120 that are used for dynamic migrations, and in some situations may be configured to be part of each of those one or more provided computer networks 120.

In the example of FIG. 1A, the public network 100 may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices of a client. In the illustrated example, the provided network extensions 120 each include multiple computing nodes 124, at least some of which are provided by or otherwise under the control of the CNS 105, and each of the provided network extensions 120 may be configured in various ways by the clients for whom they are provided. Each of the network extensions 120 in the illustrated embodiment may be a private computer network that is accessible only by the client that creates it, although in other embodiments at least some computer networks provided by the CNS 105 for clients may be publicly accessible and/or may be standalone computer networks that are not extensions to other existing computer networks. Similarly, while the provided computer networks 120 in the example are extensions to remote client computer networks 130 that are private networks, in other embodiments the provided computer networks 120 may be extensions to client computer networks 130 that are not private networks.

Private access between a remote client private computer network 130 and corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its gateway devices 122 and/or other computing systems to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, software VPN programs via electronic delivery, hardware VPN devices via physical delivery, and/or other parameters) to allow a VPN mechanism hosted on the remote client private network 130 to establish the VPN access. Such VPN connections may be established directly between corresponding gateway devices 122 and 132, or such gateway devices may instead use VPN connections that are maintained by other computing systems. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other private connection may be established to or between networks that use MPLS ("Multi Protocol Label Switching") for data transmission, such as instead of an IPsec-based VPN connection.

In addition, in the illustrated embodiment, various network-accessible remote resource services 140 are available to remote computing systems over the public network 100, including to computing nodes 134 on the remote client private networks 130. The resource services 140 may provide various functionality to the remote computing nodes, such as for at least some of the resource services 140 to provide remote computing nodes with access to various types of computing-related resources. Furthermore, at least some of the private network extensions 120 that are provided by the CNS 105 may be configured to provide access to at least some of the remote resource services 140, with that provided access optionally appearing to computing nodes 124 of the private network extensions 120 as being locally provided via virtual connections 115 that are part of the private network extensions 120, although the actual communications with the remote resource services 140 may occur over the public networks 100 (e.g., via interconnections 100b and 100c). In addition, in at least some embodiments, an NMM module 125 may be configured to use one or more of the resource services 140 as part of a dynamic migration of a computing node, such as to temporarily store software programs and/or other data as part of the dynamic migration.

The provided network extensions 120 may each be configured by clients in various manners. For example, in at least some embodiments, the CNS 105 provides multiple computing nodes that are available for use with network extensions provided to clients, such that each provided network extension 120 may include a client-configured quantity of multiple such computing nodes that are dedicated for use as part of the provided network extension. In particular, a client may interact with the module 110 to configure a quantity of computing nodes to initially be included in a computer network provided for the client (e.g., via one or more programmatic interactions with an API provided by the CNS 105). In addition, in at least some such embodiments, computing nodes may later be dynamically added to or removed from a provided computer network of a client (e.g., via one or more programmatic interactions with an API provided by the CNS 105), such as after the provided computer network has already been in use by the client (e.g., by indicating to initiate or terminate execution of particular programs on particular computing nodes). Furthermore, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. In addition, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. Furthermore, in at least some embodiments, a client may interact with the module 110 to configure various network access constraint information for a computer network provided for the client (e.g., via one or more programmatic interactions with an API provided by the CNS 105, such as to limit or enable access to other computing systems 135 and/or computing-related resource services 140), and such network access constraint information may later be dynamically modified for a provided computer network in at least some such embodiments, such as after the provided computer network has already been in use by the client. In at least some embodiments, an NMM module 125 may similarly be configured to interact with the module 110 to perform some or all such configurations of provided computer networks 120 on behalf of particular clients, such as to facilitate the dynamic migration of some or all computing nodes of client private networks 130 of those clients.

Network addresses may be configured for a provided computer network 120 in various manners in various embodiments. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer network extensions, such as based on network addresses that are available for use by the CNS 105, based on selecting network addresses that are related network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks (or for particular computing nodes 124 of the provided computer networks 120, such as for a replacement computing node to replicate the network address previously used by a migrated computing node 134), even if multiple clients specify the same or overlapping network addresses for their respective provided computer networks— in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device, a particular subset of computing nodes that are part of a group that is managed by an NMM Load Balancer module, etc.). In such embodiments, the functionality of the specified networking devices may be provided by the CNS 105 for a particular provided computer network 120 by physically providing such networking devices, or instead by virtually providing such functionality without physically providing such networking devices, as discussed in greater detail below. In such a manner, when an entire client private network 130 is dynamically and incrementally migrated to a corresponding provided computer network 120, the CNS 105 may enable the migration of the networking devices of the client private network 130 as well as the computing nodes, such that all of the client private network 130 may be shutdown after the entire network migration is completed.

In addition, the specified configuration information for a provided computer network may in at least some embodiments include routing information or other interconnectivity information between networking devices and/or groups of computing devices. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.).

As discussed in greater detail elsewhere, in at least some embodiments, the interconnections and intercommunications between computing nodes of a provided computer network are managed using an underlying substrate network of the CNS 105, and if so, some or all of the configured network topology information may be simulated in at least some such embodiments using the underlying substrate network and corresponding modules of the CNS 105. For example, each of the computing nodes provided by the CNS 105 may be associated with a node communication manager module (not shown) of the CNS 105 that manages communications to and from its associated computing nodes. If so, firewall devices, for example, may be simulated by using the associated communication manager module for a computing node to disallow or otherwise handle communications to and/or from the computing node in a manner consistent with one or more simulated firewall devices. Such node communication manager modules may similarly simulate routers and subnets by controlling how and whether intercommunications are passed between computing nodes, and by responding to requests from computing nodes for information (e.g., ARP requests) with appropriate response information. One or more external communication manager modules (not shown) of the CNS 105 may manage communications between the computing nodes provided by the CNS 105 and external computing systems, such as to similarly simulate firewall devices and enforce specified network access constraints, as well as to manage configured access mechanisms for remote resource services and private connections to remote client private computer networks. Other types of network topology information may be similarly simulated.

Network access constraint information may be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information and other routing information, the CNS 105 may enforce network access constraint information for provided computer networks in various manners.

For illustrative purposes, some embodiments are described below in which specific types of computing nodes, networks, communications, and configuration operations are performed. These examples are provided for illustrative purposes and are simplified for the sake of brevity, and the inventive techniques may be used in a wide variety of other situations, some of which are discussed below. For example, in some embodiments, the computer networks that are created and configured for access by clients are private computer network extensions to existing private computer networks of those clients, while in other embodiments the created and configured computer networks may be standalone computer networks that are not extensions to other computer networks and/or may be public computer networks that are not privately accessible by the client on whose behalf they are created and configured. Furthermore, in some embodiments, particular computer networks provided by a configurable network service may be configured to enable private access to or other inter-communications with other computer networks provided by the configurable network service, while in other embodiments such inter-communications between multiple provided computer networks may not be provided. In addition, in some embodiments the computer networks provided by the configurable network service use computing nodes that are provided by and controlled by a configurable network service, while in other embodiments at least some such computing nodes that are used for provided computer networks may be controlled or maintained by others (e.g., by third-parties, by the clients, etc.) but made available for use with the configurable network service. For example, in some embodiments, an NMM module may access and use computing nodes provided by and controlled by multiple distinct configurable network services whose computing nodes are in one or more geographical locations distinct from a location of the NMM module and/or of one or more computing nodes whose migration is facilitated by the NMM module (e.g., based on the NMM module directly interacting with multiple distinct configurable network services, based on a particular configurable network service from a first entity providing functionality to the NMM module by interacting with another configurable network service from a second entity to obtain access to functionality from that second configurable network service on behalf of the NMM module, etc.), such as to provide a specified degree of geographical distribution of the computing nodes of the group.

Figure 1B:
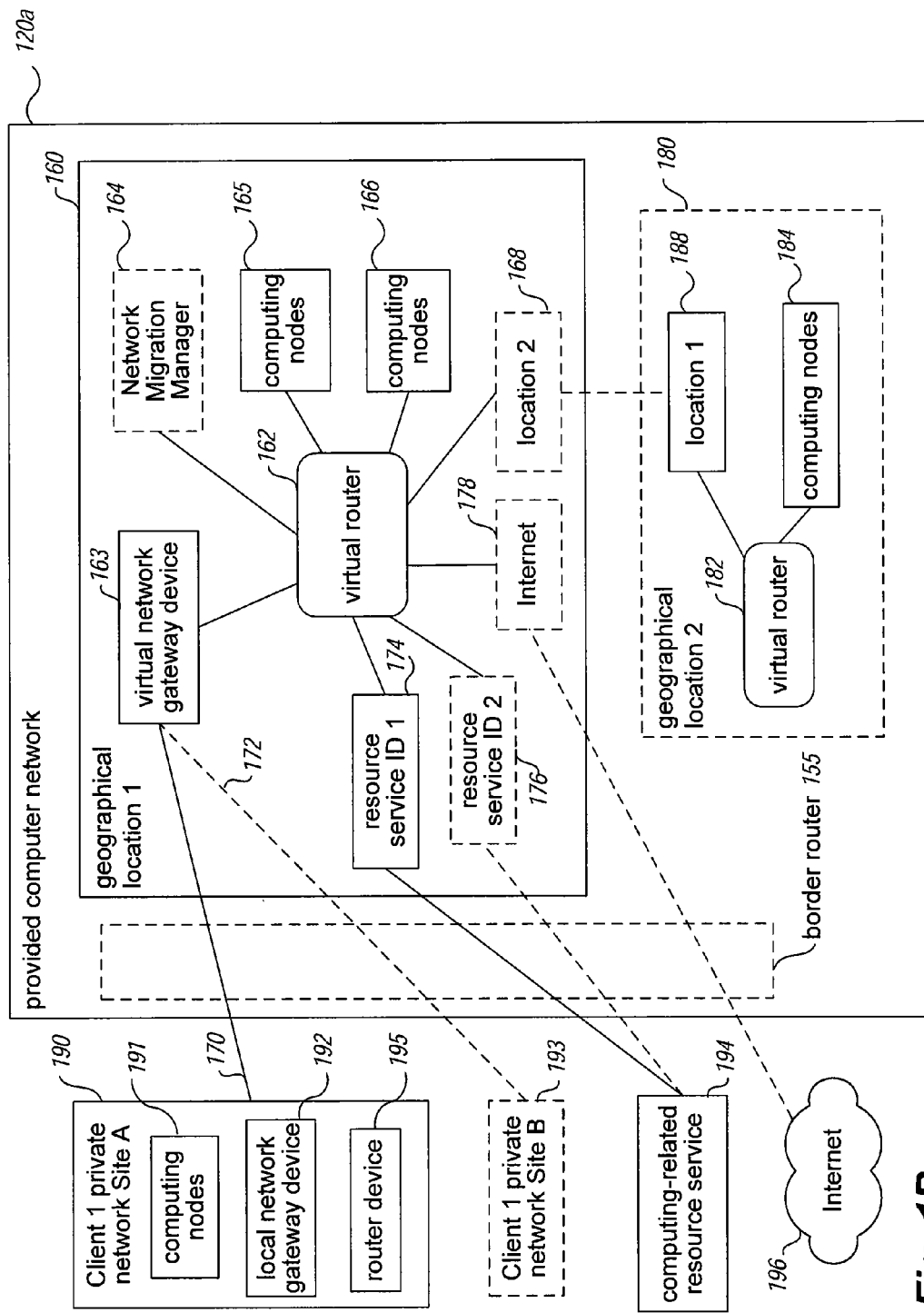
Figure 2:
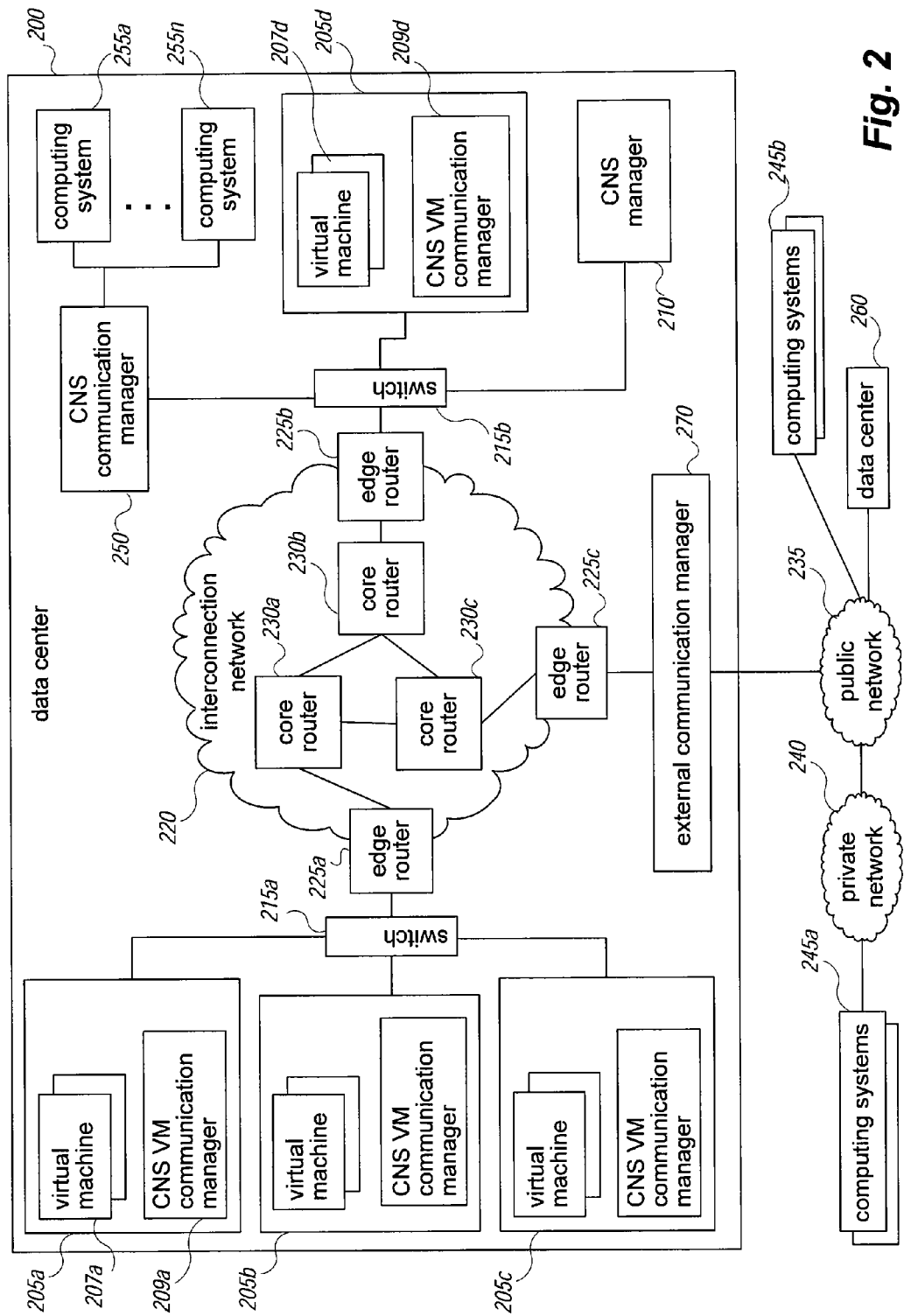
FIG. 2 is a network diagram illustrating an example embodiment of interconnected computing systems for use in providing capabilities for dynamically migrating computer network computing nodes.

FIG. 1B illustrates additional details regarding an example computer network 120a that may be provided by the CNS 105 (or other embodiment of a network-accessible service) for a client, with the provided computer network 120a in this example being a private network extension to a remote private computer network of the client, such as one of the remote private computer networks 130 of FIG. 1A. In this example, various connections and communication paths for the provided computer network 120a are shown in a conceptual manner to illustrate types of configurable network access constraints and network topology, and FIG. 2 illustrates additional details regarding an example of underlying substrate networks and connections that may be used to create provided computer networks such as the example provided computer network 120a. In addition, in this example, an NMM module 164 associated with the provided computer network 120a is illustrated as being part of the network 120a, although in other embodiments the NMM module may not be part of the provided computer network 120a or even provided as part of the CNS 105.

In particular, in FIG. 1B, the provided computer network 120a includes various computing nodes provided by the CNS 105 that are located at a first geographical location 1 160 (e.g., at a first data center at the geographical location 1), with the various computing nodes being configured into logical groups 165 and 166 in this example (e.g., to correspond to different subnets and/or associated configured networking devices, not shown). In this example, a single conceptual virtual router 162 is shown at geographical location I to control communications between those computing nodes and other computing systems, so as to illustrate different types of communications that may occur, although the provided computer network 120a may actually have multiple or no configured networking devices at geographical location 1, and the computer network 120a may be implemented by the configurable network service at the geographical location 1 in various manners, such as via multiple physical interconnected routers or other networking devices, by using an underlying substrate network and associated modules that control communications over the underlying substrate network, etc. In this example, the virtual router 162 operates in accordance with the configured information for the provided computer network 120a, including configured network topology information, configured access to remote resource services, and other configured network access constraint information, such as to route communications that are sent to network addresses within the provided computer network 120a to corresponding destination computing nodes on the provided computer network 120a, and to route other communications to other network addresses outside of the provided computer network 120a as appropriate. Furthermore, communications that are not permitted by configured firewall devices, configured network topology information, or other configured network access constraints may be blocked or otherwise managed by the virtual router 162.

In this example, the computer network 120a is provided for an example Client 1, and is a network extension to a remote computer network of Client 1. Client 1's remote computer network includes multiple computing nodes 191 at a first remote location Site A 190, as well as a gateway device 192 and one or more physical router networking devices 195, and the virtual router 162 is configured to communicate with those multiple computing nodes via a virtual communication link 170 between the gateway devices 192 and 163. For example, as discussed in greater detail elsewhere, the provided computer network 120a may include one or more configured VPN connections to the multiple computing systems at Site A 190, and the communication link 170 may correspond to one or more such VPN connections. In addition, when one or more of the computing nodes 165 and/or 166 are replacement computing nodes for migrated computing nodes that were previously part of the computing nodes 191, the NMM module 164 may configure the gateway devices 192 and 163 to route communications from other computing nodes 191 to one or more of those replacement computing nodes 165 and/or 166 at the provided computer network 120a via the virtual communication link 170, and similarly to route communications from those replacement computing nodes 165 and/or 166 at the provided computer network 120a to computing nodes 191 via the virtual communication link 170.

In addition, the remote computer network of Client 1 may optionally include computing nodes at one or more other locations, such as the illustrated optional Site B 193, and if so the computing nodes at Site A 190 and at Site B 193 may be interconnected via one or more communication links (not shown), such as via the Internet 196 and/or one or more private connections—in such situations, the NMM module 164 may similarly configure gateway device 163 and a gateway device (not shown) at Site B to route communications between the computing nodes (not shown) at Site B 193 and the replacement computing nodes 165 and/or 166, such as via those one or more communication links between Sites A and B and/or via an optional virtual communication link 172 to Site B 193 (e.g., via one or more other configured VPN connections directly to Site B). When multiple VPN connections or other private connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other private connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other private connection to the remote computing systems may be used, with the remote computer network being responsible for routing the communications to the appropriate site and computing system.

In addition, the provided computer network 120a may be configured to allow all, some or no communications between the computing nodes of the provided computer network 120a and other external computing systems that are generally accessible on the Internet 196 or other public networks. If at least some such external communications are allowed, the virtual router 162 may further be configured to communicate with those external multiple computing systems via an optional virtual communication link 178 of the provided computer network 120a, such as in conjunction with an optional virtual border router 155 for the provided computer network 120a. The virtual border router 155 may be physically implemented in various manners, such as by the CNS 105 using one or more actual firewall devices or border router devices that manage communications between external computing systems and the various computing nodes provided by the CNS 105 at geographical location 1 (e.g., actual devices that support numerous computer networks provided by the CNS 105 to clients that use those computing nodes of the CNS 105), by using an underlying substrate network and associated modules that control communications over the underlying substrate network (e.g., to prevent disallowed communications from being sent by computing nodes of the provided computer network 120a onto the substrate network), etc. Furthermore, the virtual border router 155 may further conceptually assist in managing other communications to other computing systems external to the provided computer network 120a, such as to the remote client computer network at Sites A and B, to one or more remote resource services, etc.

In addition, the provided computer network 120a may be configured to provide private or other specialized access to one or more remote resource services, such as by assigning one or more network addresses of the provided computer network 120a to represent those one or more remote resource services, and by optionally configuring particular actions to be taken for communications sent to those assigned network addresses. In this example, the virtual router 162 has been configured to provide local access to remote resource service 194 via a virtual communication link 174 of the provided computer network 120a. Thus, for example, if one of the computing nodes of the provided computer network 120a sends a communication to a particular network address of the provided computer network 120a that is mapped to the communication link 174, the virtual router may forward that communication to the remote resource service 194 external to the provided computer network 120a (e.g., via the Internet or other public networks). In other embodiments, the remote resource service 194 may implement an interface that is part of the CNS 105 or otherwise at the geographical location 1, and if so the communications sent to the particular network address of the provided computer network 120a that is mapped to the communication link 174 may instead be forwarded to that interface of the remote resource service for handling. In addition, the virtual communication link 174 may be configured in at least some embodiments to manage communications sent via the link in various manners, such as to modify those communications in one or more manners before they are forwarded to the remote resource service 194, or to otherwise access the remote resource service 194 in a specialized manner. For example, in the illustrated embodiment, the virtual communication link 174 may be configured to correspond to a particular namespace within the remote resource service 194, with a subset of the computing-related resources provided by the remote resource service 194 being part of that namespace, or may instead be configured to correspond to one or more particular identifiers or other access control indicators that are associated with the provided computer network 120a by the configurable network service or by the remote resource service 194. In addition, if the virtual communication link 174 is configured to correspond to a particular namespace or to otherwise correspond to a subset of the resources provided by the remote resource service 194, the provided computer network 120a may optionally be further configured to include one or more other virtual communication links that also correspond to the same remote resource service 194 but are configured to access the remote resource service 194 in other manners, such as if the provided computer network 120a optionally includes a distinct virtual communication link 176 that is configured to access the remote resource service 194 in a distinct manner than that of virtual communication link 174 (e.g., to correspond to a distinct second namespace, to not correspond to any particular namespace, to use an identifier of a customer of the remote resource service 194 that is distinct from a customer identifier used for communication link 174, etc.).

In the illustrated embodiment, in addition to the computing nodes of the CNS 105 at geographical location 1, the provided computer network 120 may optionally further include computing nodes 184 provided by the CNS 105 that are located at a second geographical location 2 180 (e.g., at a distinct second data center at the geographical location 2). Accordingly, the virtual router 162 may be configured to include an optional virtual communication link 168 to the portion of the provided computer network 120a at the geographical location 2. In this example, the portion of the provided computer network 120a at the geographical location 2 similarly is illustrated with a conceptual virtual router 182 to manage communications to and from the computing nodes 184, including to communicate with the portion of the provided computer network 120 at the geographical location 1 via a virtual communication link 188. Such communications between computing nodes of the CNS 105 at different geographical locations may be handled in various manners in various embodiments, such as by sending the communications over the Internet or other public networks (e.g., as part of a secure tunnel, such as that uses encryption supported by the CNS 105), by sending the communications in a private secure manner (e.g., via a dedicated lease line between the geographical locations) or other private manner, etc. In addition, while not illustrated here, the portion of the provided computer network 120a at the geographical location 2 may similarly include some or all of the same types of other virtual communication links illustrated for the portion at geographical location 1, such as to a remote client private network (e.g., via a gateway device at location 2 and/or one or more VPN connections distinct from any VPN connections to the geographical location 1), to remote resource services, to the Internet, etc.

In such situations in which a provided computer network 120a includes computing nodes at multiple geographical locations or otherwise includes computing nodes that differ with respect to one or more attributes, when the NMM module facilitates dynamic migration of a computing node 191 to a replacement computing node 165, 166 or 184, the NMM module 164 may further be configured in some embodiments to select between particular candidate computing nodes or types of computing nodes at the provided computer network 120a that are available to be used as replacement computing nodes for the migration (e.g., based on attributes of those computing nodes, based on distance to or other relationships of those computing nodes with other indicated computing-related resources, etc.), or to otherwise provide information related to such candidate replacement computing nodes for use by such a selection by Client 1, as discussed in greater detail elsewhere.

It will be appreciated that the example provided computer network 120a of FIG. 1B is included for exemplary purposes, and that other computer networks provided by the CNS 105 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links illustrated in FIG. 1B may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resources, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

FIG. 2 is a network diagram illustrating an example embodiment of computing systems for use in providing computer networks, such as by an embodiment of a configurable network service. In particular, in this example, a number of physical computing systems are co-located in a data center 200 and are interconnected via various physical networking devices and one or more physical networks. The physical computing systems and other devices are used in this example by a configurable network service to provide multiple computer networks for clients, by establishing and maintaining each of the provided computer networks as a virtual network, and by using the physical network(s) as a substrate network on which the virtual networks are overlaid. For example, with respect to the example of FIG. 1B, the data center 200 may be located at geographical location 1, and the illustrated physical computing systems may be used to provide the computing nodes 165 and 166 of provided computer network 120a. The use of the overlay networks and underlying substrate network may be transparent to the computing nodes of the provided computer networks in at least some embodiments.

In addition, one or more NMM modules may be located in various locations, and may use the provided computer networks as part of providing functionality for facilitating dynamic migration of computer network computing nodes. For example, one or more such NMM modules may each be part of a private network 240 and communicate with a corresponding provided computer network at the data center 200 via the public network 235, or may instead be associated with one or more other computing systems 245b or other computing systems at a data center 260 that are directly connected to the public network 235. While not illustrated here, in some embodiments, the computing systems at the data center 200 may further include one or more such NMM modules, which may interact with the manager module 210 over the internal network 220 in order to facilitate dynamic migration of computer network computing nodes.

In this example, the computer networks provided by the configurable network service are implemented as virtual overlay networks that send communications via an underlying physical substrate network. The provided virtual overlay networks may be implemented in various ways in various embodiments, such as without encapsulating communications in some embodiments (e.g., by embedding virtual network address information for a virtual network in communications configured for a networking protocol of the physical substrate network). As one illustrative example, a virtual network may be implemented using 32-bit IPv4 ("Internet Protocol version 4") network addresses, and those 32-bit virtual network addresses may be embedded as part of 128-bit IPv6 ("Internet Protocol version 6") network addresses used by the physical substrate network, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual network and substrate network may be implemented using the same network addressing protocol (e.g., IPv4 or IPv6), and data transmissions sent via the provided virtual overlay network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay networks may be implemented using encapsulation of communications.

The illustrated example of FIG. 2 includes a data center 200 with multiple physical computing systems operated by an embodiment of the configurable network service. The data center 200 is connected to one or more public networks 235 external to the data center 200, which provide access to one or more remote computing systems 245a via private network 240, to one or more other globally accessible data centers 260 that each have multiple computing systems at other geographical locations, and to one or more other remote computing systems 245b. The public network 235 may be, for example, a publicly accessible network of networks, possibly operated by various distinct parties, such as the Internet, and the private network 240 may be, for example, a corporate network that is wholly or partially inaccessible from computing systems external to the private network 240. Computing systems 245b may each be, for example, a home computing system that connects directly to the Internet (e.g., via a telephone line, cable modem, a Digital Subscriber Line ("DSL"), etc.)

In this example, the configuring of the virtual provided computer networks is facilitated by a manager module 210 of the configurable network service, and multiple other modules of the configurable network service are used to implement functionality of the provided computer networks, such as from the edge of the physical substrate network by modifying communications that enter and/or leave the substrate network. In particular, in this example, multiple node communication manager modules of the configurable network service each manage communications to and from associated computing nodes, such as the illustrated node communication manager modules 209a, 209d and 250 as discussed in greater detail below. In addition, in this example, an external communication manager module 270 of the configurable network service manages communications between the physical computing systems within the data center 200 and external computing systems, as discussed in greater detail below. While only a single external communication manager module 270 is illustrated in this example, it will be appreciated that the functionality of the module 270 may be implemented using multiple devices.

The example data center 200 includes a number of physical computing systems 205a-205d and 255a-255n, as well as a CNS node communication manager module 250 that executes on one or more other computing systems (not shown) to manage communications for the associated computing systems 255a-255n, and a manager module 210 of the configurable network service that executes on one or more computing systems (not shown). In this example embodiment, each physical computing system 205a-205d hosts multiple virtual machine computing nodes and also includes a virtual machine ("VM") node communication manager module (e.g., as part of a virtual machine hypervisor monitor for the physical computing system), such as the CNS VM node communication manager module 209a and virtual machines 207a on computing system 205a, and such as CNS VM node communication manager module 209d and virtual machines 207d on computing system 205d. Each of the virtual machine computing nodes may be used by the configurable network service as a distinct computing node of a computer network provided for a client. Physical computing systems 255a-255n do not execute any virtual machines in this example, and thus may each act as a distinct computing node that is part of a computer network provided for a client by the configurable network service. In other embodiments, all or none of the physical computing systems at the data center may host virtual machines.

This example data center further includes multiple physical networking devices, such as switches 215a and 215b, edge routers 225a-225c, and core routers 230a-230c. Switch 215a is part of a physical network that includes physical computing systems 205a-205c, and is connected to edge router 225a. Switch 215b is part of a distinct physical network that includes physical computing systems 205d, 255a-255n, and the computing system(s) providing the CNS node communication manager module 250 and the CNS system manager module 210, and is connected to edge router 225b. The physical networks established by switches 215a-215b, in turn, are connected to each other and other networks (e.g., the public network 235) via an intermediate interconnection network 220, which includes the edge routers 225a-225c and the core routers 230a-230c. The edge routers 225a-225c provide gateways between two or more networks. For example, edge router 225a provides a gateway between the physical network established by switch 215a and the interconnection network 220. Edge router 225c provides a gateway between the interconnection network 220 and public network 235. The core routers 230a-230c manage communications within the interconnection network 220, such as by forwarding packets or other data transmissions as appropriate based on characteristics of such data transmissions (e.g., header information including source and/or destination substrate network addresses, protocol identifiers, etc.) and/or the characteristics of the interconnection network 220 itself (e.g., routes based on physical network topology, etc.).

The illustrated node communication manager modules manage communications sent to and from associated computing nodes. For example, node communication manager module 209a manages associated virtual machine computing nodes 207a, node communication manager module 209d manages associated virtual machine computing nodes 207d, and each of the other node communication manager modules may similarly manage communications for a group of one or more other associated computing nodes. The illustrated node communication manager modules may manage communications between computing nodes so as to overlay multiple virtual networks over the intermediate physical substrate network (e.g., the interconnection network 220 and the physical networks associated with switches 215a and 215b), and may implement firewall policies and other network access constraints to control such communications. The external communication manager module 270 manages external communications that enter and leave the data center 200, such as to further implement the overlay networks over the substrate network within the data center 200 with regard to such external communications. The external communication manager module 270 may take actions to implement firewall policies and other network access constraints, including at least some configured access mechanisms for provided computer networks that allow private or other specialized access to remote resource services external to the data center 200, and optionally at least some VPN connections to external remote client computer networks, or may instead operate in conjunction with other hardware and/or software (not shown) that implements the configurable network service's portion of such VPN connections.

Thus, as one illustrative example, one of the virtual machine computing nodes 207a on computing system 205a may be part of a particular provided virtual computer network (e.g., provided computer network 120a of FIG. 1B) for a client, along with one of the virtual machine computing nodes 207d on computing system 205d and with the computing system 255a (and optionally other computing nodes in this data center or in one or more other data centers 260 that are also used by the configurable network service), and with IPv4 being used to represent the virtual network addresses for the virtual network. Other of the virtual machine computing nodes 207a, virtual machine computing nodes 207d, and computing systems 255b-255n (as well as other of the illustrated computing nodes) may be currently dedicated to other computer networks being provided to other clients, may be currently unassigned to a provided computer network and available for use by the configurable network service, and/or may also be part of the same particular provided virtual computer network. A program executing for the client on the virtual machine computing node 207a that is part of the particular provided virtual computer network may then direct an outgoing communication (not shown) to the virtual machine computing node 207d of the particular provided virtual computer network, such as by specifying a virtual network address for that provided virtual computer network that is assigned to that destination virtual machine computing node 207d. The node communication manager module 209a receives the outgoing communication, and in at least some embodiments determines whether to authorize the sending of the outgoing communication, such as based on previously configured information about the sending virtual machine computing node 207a and/or about the destination virtual machine computing node 207d, and/or by dynamically interacting with the system manager module 210 (e.g., to obtain an authorization determination, to obtain some or all such information, etc.).

If the node communication manager module 209a determines that the outgoing communication is authorized (or does not perform such an authorization determination), the module 209a determines the actual physical substrate network location corresponding to the destination virtual network address for the communication. In this example, the interconnection network uses IPv6 to represent the actual network addresses for computing nodes connected via the interconnection network, and the module 209a re-headers the outgoing communication so that it is directed to node communication manager module 209d using an actual IPv6 substrate network address. The node communication manager module 209a may determine the actual IPv6 destination network address to use for the virtual network address of the destination virtual computing node 207d by, for example, dynamically interacting with the system manager module 210, or may have previously determined and stored that information (e.g., in response to a prior request from the sending virtual machine computing node 207a for information about that destination virtual network address, such as a request using ARP). In this example, the actual IPv6 destination network address that is used embeds the virtual destination network address and additional information, so as to send the communication over the overlay network without encapsulation.

When the node communication manager module 209d receives the communication via the interconnection network 220, it extracts the virtual destination network address and additional information from the actual IPv6 destination network address, and determines to which of the virtual machine computing nodes 207d that the communication is directed. The node communication manager module 209d next optionally determines whether the communication is authorized for the destination virtual machine computing node 207d, such as by extracting the virtual source network address and additional information from the actual IPv6 source network address, and confirming that the computing node with that virtual source network address is actually managed by the node communication manager module that forwarded the communication (in this example, node communication manager module 209a), so as to prevent spoofing of source network addresses by malicious senders. If the communication is determined to be authorized (or the node communication manager module 209d does not perform such an authorization determination), the module 209d then re-headers the incoming communication so that it is directed to the destination virtual machine computing node 207d using an appropriate IPv4 network address for the virtual network, such as by using the sending virtual machine computing node's virtual network address as the source network address and by using the destination virtual machine computing node's virtual network address as the destination network address. After re-headering the incoming communication, the module 209d then forwards the modified communication to the destination virtual machine computing node. In at least some embodiments, before forwarding the incoming communication to the destination virtual machine, the module 209d may also perform additional steps related to security. For example, the module 209d may verify that the sending virtual machine computing node is authorized to communicate with the destination virtual machine (e.g., based on belonging to the same virtual network and/or on network access constraint information specified for that provided virtual network, being associated with the same customer or other entity, being associated with different entities and/or computer networks whose computing nodes are authorized to intercommunicate, etc.) and/or that the incoming communication is of an allowed type, such as based on information previously obtained by the module 209d or based on interacting with the system manager module 210.

If the sending virtual machine computing node 207a instead (or in addition) directs an outgoing communication (not shown) to one or more intended destination computing systems external to the data center 200, the node communication manager module 209a receives and handles the outgoing communication in a similar manner. An intended external destination computing system may be, for example, another computing node that is part of the same particular provided virtual computer network (e.g., on a remote virtual client computer network for which the particular provided computer network is an extension, or at another data center 260 that is also used by the configurable network service to provide a portion of the particular virtual computer network), a computing system of a remote resource service, a computing system that is publicly accessible on the Internet, etc. In at least some embodiments and situations, the module 209a may first determine whether to authorize the sending of the outgoing communication, and if so determines the actual physical substrate network location corresponding to the destination network address for the communication. In this example, the determined physical substrate network location corresponds to the external communication manager module 270, such as if the module 270 is associated with all virtual and/or actual network addresses that are not otherwise assigned to node communication manager modules. When the module 270 receives the communication via the interconnection network 220, it similarly extracts the destination network address and additional information from the received communication, and determines whether and how to forward the communication, including optionally determining whether the communication is authorized for the intended destination. If the communication is determined to be authorized (or the module 270 does not perform such an authorization determination), the module 270 then re-headers the incoming communication so that it is directed to the destination using an appropriate IPv4 public network address (or other network address appropriate for the public network 235), and then forwards the modified communication over the public network 235. In this manner, the external communication manager 270 and/or various node communication manager modules may optionally be configured to provide some or all of the functionality of the gateway devices for the provided virtual computer networks.

Thus, as previously discussed, a variety of techniques may be used to provide capabilities for dynamic migration of computer network computing nodes, including by using replacement computing nodes that are part of provided virtual computer networks.

As previously noted, in at least some embodiments an NMM module may interact with a remote network-accessible service, such as a configurable network service that provides virtual computer networks to remote clients. The configurable network service or other network-accessible service may in at least some embodiments be a fee-based service, such that users of the network-accessible service are customers that pay fees to the network-accessible service for at least some of the functionality provided by the network-accessible service. In addition, in at least some embodiments, the computing nodes used by the configurable network service to provide computer networks to clients may have various forms, such as physical computing systems and/or virtual machines that are each hosted on one or more physical computing systems. For example, in some embodiments, the configurable network service may include a large number of computing nodes that are provided by the configurable network service to be available for use in computer networks provided to clients, such as in one or more data centers in one or more geographical locations. In addition, in at least some embodiments, some or all of the computing nodes provided by the configurable network service are interconnected by one or more intermediate physical networks, and the computer networks provided to clients may be virtual (or "logical") networks that are overlaid over the intermediate physical networks by using the intermediate physical networks as a substrate network. Furthermore, in at least some embodiments, at least some of the computing nodes may be used by a program execution service (or "PES") that executes multiple programs on behalf of multiple customers or other users of the program execution service. Additional details related to computing nodes and underlying computer networks are included below, and additional details related to example embodiments of providing virtual networks to clients and providing a program execution service are included in U.S. application Ser. No. 12/332,214, filed Dec. 10, 2008 and entitled "Providing Access to Configurable Private Computer Networks;" in U.S. application Ser. No. 11/394,595, filed Mar. 31, 2006 and entitled "Managing Communications Between Computing Nodes;" in U.S. application Ser. No. 11/395,463, filed Mar. 31, 2006 and entitled "Managing Execution of Programs by Multiple Computing Systems;" in U.S. application Ser. No. 11/692,038, filed Mar. 27, 2007 and entitled "Configuring Intercommunications Between Computing Nodes;" in U.S. application Ser. No. 12/060,074, filed Mar. 31, 2008 and entitled "Configuring Communications Between Computing Nodes;" and in U.S. application Ser. No. 11/764,739, filed Jun. 18, 2007 and entitled "Providing Enhanced Access To Remote Services;" each of which is incorporated herein by reference in its entirety.

Thus, as described above with respect to FIG. 2, in at least some embodiments, the network-accessible configurable network service provides virtual computer networks to clients by implementing them as overlay networks using an underlying substrate network, such as using various communication manager modules of the configurable network service. One or more system manager modules of the configurable network service may further facilitate configuring communications between computing nodes, such as by tracking and/or managing which computing nodes belong to which provided virtual networks, and by providing information about actual physical substrate network addresses that correspond to virtual network addresses used for a particular virtual network (e.g., by a particular customer or other entity). In addition, a system manager module may receive an indication of a virtual machine computing node on a target physical computing system and of a provided virtual network to which the virtual machine is to be associated, and then initiate configuration of a virtual machine node communication manager module for the target physical computing system so as to associate the virtual machine with the virtual network, or the node communication manager module may instead initiate that configuration (e.g., when the virtual machine first initiates or receives a communication). In some embodiments, a system manager module and/or an associated node communication manager module may further participate in provisioning a particular virtual machine computing node of a provided virtual network in various manners (e.g., in response to instructions from a user associated with the provided virtual network and/or an NMM module on behalf of such a user), such as to take indicated actions so that the virtual machine computing node is ready to execute one or more software program when the user associated with the provided virtual network initiates that execution, and/or to initiate execution of one or more indicated software programs on the virtual machine computing node on behalf of the user.

Figure 3:
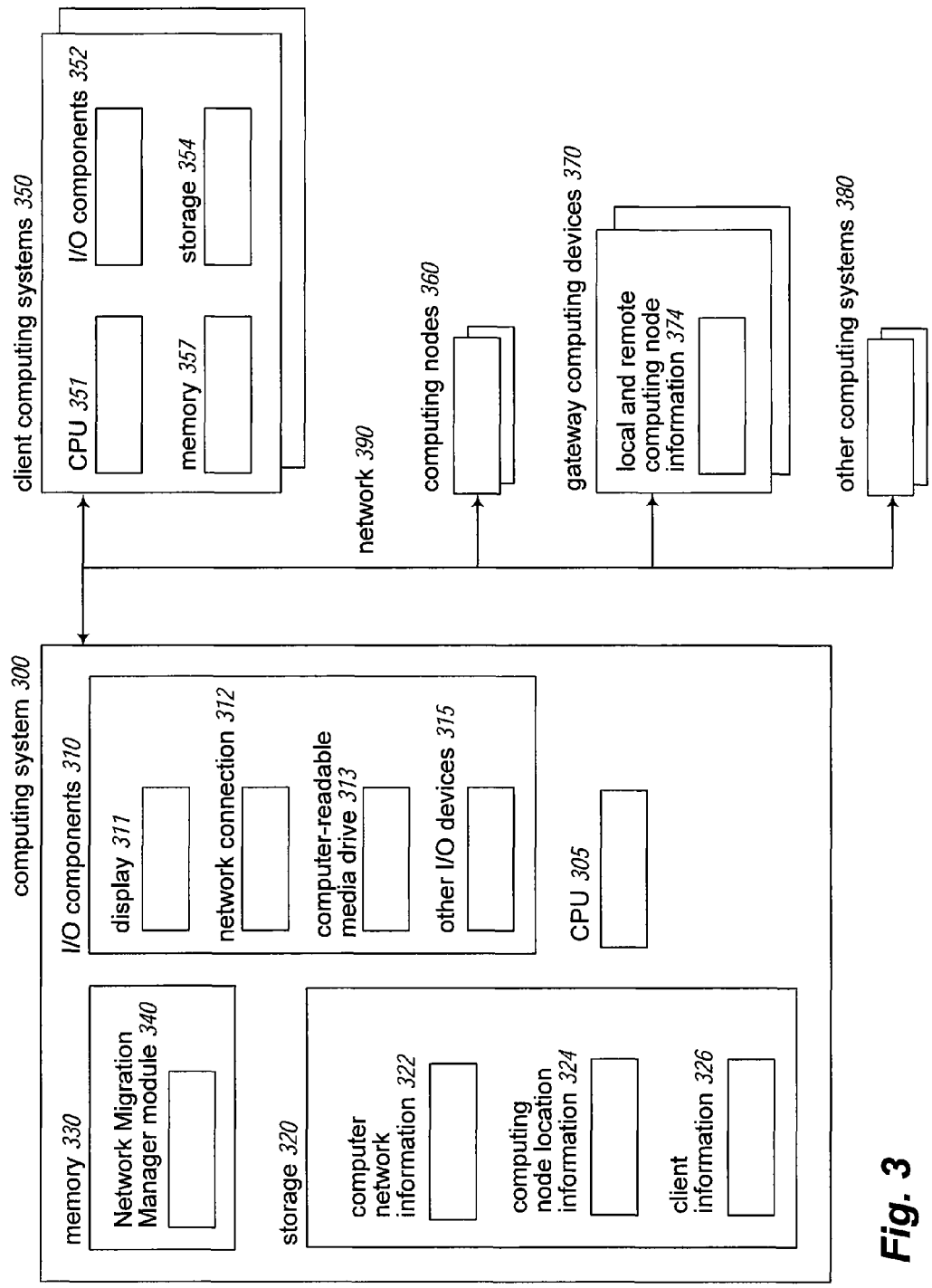
FIG. 3 is a block diagram illustrating example computing systems suitable for providing capabilities for dynamically migrating computer network computing nodes.

FIG. 3 is a block diagram illustrating example computing systems suitable for providing functionality to facilitate dynamic migration of computer network computing nodes. In particular, FIG. 3 illustrates a computing system 300 suitable for executing an embodiment of an NMM module that facilitates dynamic migration of computer network computing nodes, as well as various client computing systems 350, computing nodes 360, gateway computing devices 370, and other computing systems 380. While not illustrated here, in some embodiments at least some of the illustrated computing systems, devices and nodes may be co-located or otherwise associated together (e.g., the computing system 300 and at least some of the computing nodes 360 and gateway devices 370), such as by being part of a single computer network and/or at a common data center, as described in greater detail with respect to FIGS. 1B and 2. In addition, while not illustrated here, a configurable network service may be accessible to the NMM module and used in at least some embodiments, such as from one or more of the other computing systems 380, and if so at least some of the computing nodes 360 and gateway devices 370 may be provided by the configurable network service and be located remotely from other of the computing nodes 360 and gateway devices 370.

In the illustrated embodiment, the computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computing systems 350 have components similar to those of server computing system 300, including a CPU 351, I/O components 352, storage 354, and memory 357. The other computing systems 380, gateway devices 370 and computing nodes 360 may also each include similar components to some or all of the components illustrated with respect to server computing system 300, but such components are not illustrated in this example for the sake of brevity. In addition, an embodiment of a Network Migration Manager ("NMM") module 340 is executing in memory 330. While the NMM module is illustrated in this example as being part of a configured general-purpose computing system, in other embodiments the computing system 300 may instead be a special-purpose device that is designed and/or configured to provide the capabilities of the NMM module.

The executing NMM module interacts with other computing systems, devices and nodes over one or more networks 390 (e.g., via the Internet and/or the World Wide Web, via a private cellular network, via a private substrate network in use by the configurable network service, etc.). In this example embodiment, the module 340 facilitates dynamic migration of at least some of the computing nodes 360 of one or more originating computer networks to other replacement computing nodes 360 that are part of other destination computer networks. Each of the originating and destination computer networks (not shown), and optionally at least some of the other computing systems 380, may be associated with one or more particular users or other entities (not shown), and such a user (or a user representing that entity) may use one of the client computing systems 350 to configure and access the computing nodes and computing systems of such a computer network. Such a user may similarly interact with the NMM module 340 to initiate and configure the dynamic migration of computer network computing nodes, such as by providing information about an originating computer network and its computing nodes, by optionally providing information about a destination computer network, by providing indications of particular computing nodes that have been migrated or that the NMM module 340 is to migrate, to provide information about the client (e.g., contact information, payment information, etc.), to provide payment corresponding to operations of the service provided by the NMM module 340, etc.

In addition, the NMM module 340 may take various actions to dynamically facilitate the incremental migration of computer network computing nodes at various times. In the illustrated embodiment, the module 340 may have access to various information 326 about clients for which the NMM module is dynamically facilitating the migration of computer network computing nodes, information 322 about originating and destination computer networks of those clients, and information 324 about locations and other associated information for migrated computing nodes and replacement computing nodes. The various information may be gathered from clients and from interactions with originating and destination computer networks, such as computing node status information that the module 340 requests and gathers (e.g., periodically) and/or that is pushed to the module 340 (e.g., periodically, upon the occurrence of events of interest, etc.). In addition, the NMM module may use the computing node information 324 to assist in configuring the gateway devices 370 that support originating and destination computer networks participating in dynamic migrations of computer network computing nodes, such as by providing each of those gateway devices with information 374 to use in forwarding communications between computing nodes of originating computer networks and destination computer networks as appropriate. The NMM module may further perform various interactions with one or more configurable network services in at least some embodiments and situations, such as to configure gateway devices provided by the configurable network service(s), add computing nodes 360 to computer networks provided by the configurable network service(s) for use as replacement computing nodes, initiate provisioning of replacement computing nodes, etc. For example, the other computing systems 380 may include computing systems of such a configurable network service that are available for use in provided computer networks, such as host computing systems that may each host one or more computing nodes. In some such situations, a user of a client computing system 350 may first interact with the configurable network service to configure a particular virtual computer network from the configurable network service (e.g., as an extension to a physical computer network of the client), and may provide information 322 to associate that virtual computer network with the client's computer network. In other situations, the module 340 may instead be configured to interact with the configurable network service to create one or more such virtual computer networks for use by the module 340, such as to use a particular provided virtual computer network from the configurable network service on behalf of a particular client.

The other computing systems 350 and 380, gateway devices 370, and computing nodes 360 may be executing various software as part of interactions with the module 340. For example, some or all of the client computing systems 350 may each be executing software in memory 357 to interact with module 340 (e.g., as part of a Web browser or specialized client-side application program), such as to enable a user of a client computing system to configure operations of the module 340 with respect to one or more computer networks associated with the user. Furthermore, some or all of the client computing systems 350 and/or other computing systems 380 may each be executing software in memory 357 to interact on behalf of a client with a computer network being provided by a configurable network service for the client, such as via a VPN connection that connects multiple of the other computing systems 380 that are part of a remote network for a client to multiple of the computing nodes 360 as part of a provided computer network extension for the client's remote network. Furthermore, some of the computing nodes 360 and/or the other computing systems 380 may execute software modules (not shown) to assist in providing the functionality of the module 340, such as communication manager modules that assist in managing communications sent to and from computing nodes and that provide status information regarding those computing nodes to the module 340, or computing nodes 360 that similarly include software to provide such status information to the module 340. Similarly, some or all of the gateway devices 370 may similarly execute software modules (not shown) to assist in providing the functionality of the module 340, such as software modules to facilitate the NMM module 340's configuration of the gateway devices. In addition, other of the computing systems 380 may perform other functions, such as to execute remote resource services available to various users.

It will be appreciated that computing systems 300, 350 and 380, gateway computing devices 370, and computing nodes 360 are merely illustrative and are not intended to limit the scope of the present invention. The computing systems, devices and/or nodes may instead each include multiple interacting computing systems or devices, and the computing systems/devices/nodes may be connected to other devices that are not illustrated, including through one or more networks such as the Internet, via the Web, or via private networks (e.g., mobile communication networks, etc.). More generally, a computing node, computing device or other computing system may comprise any combination of hardware or software that may interact and perform the described types of functionality, including without limitation desktop or other computers, database servers, network storage devices, network routers and other networking devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated module 340 may in some embodiments be distributed in additional modules, or the module 340 may in some embodiments be integrated with or otherwise associated with a configurable network service, and if so may also incorporate functionality described elsewhere as being provided by one or more modules of the configurable network service (e.g., one or more system manager modules, one or more node communication manager modules, one or more external communication manager modules, etc.). Similarly, in some embodiments, some of the functionality of the module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. In addition, the storage that is used by the NMM module 340 may in some embodiments be located partially or wholly on computing system 300, while in other embodiments may be located partially or wholly external to computing system 300 (e.g., as network-accessible storage, such as provided on one or more other computing systems 380 and/or other network-accessible storage devices). Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), network processors, etc. Some or all of the modules, systems and data structures may also be stored (e.g., as software instructions or structured data) on a computer-readable medium, such as a hard disk, a memory, a network, or a portable media article to be read by an appropriate drive or via an appropriate connection, and executed by one or more processors. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 5:
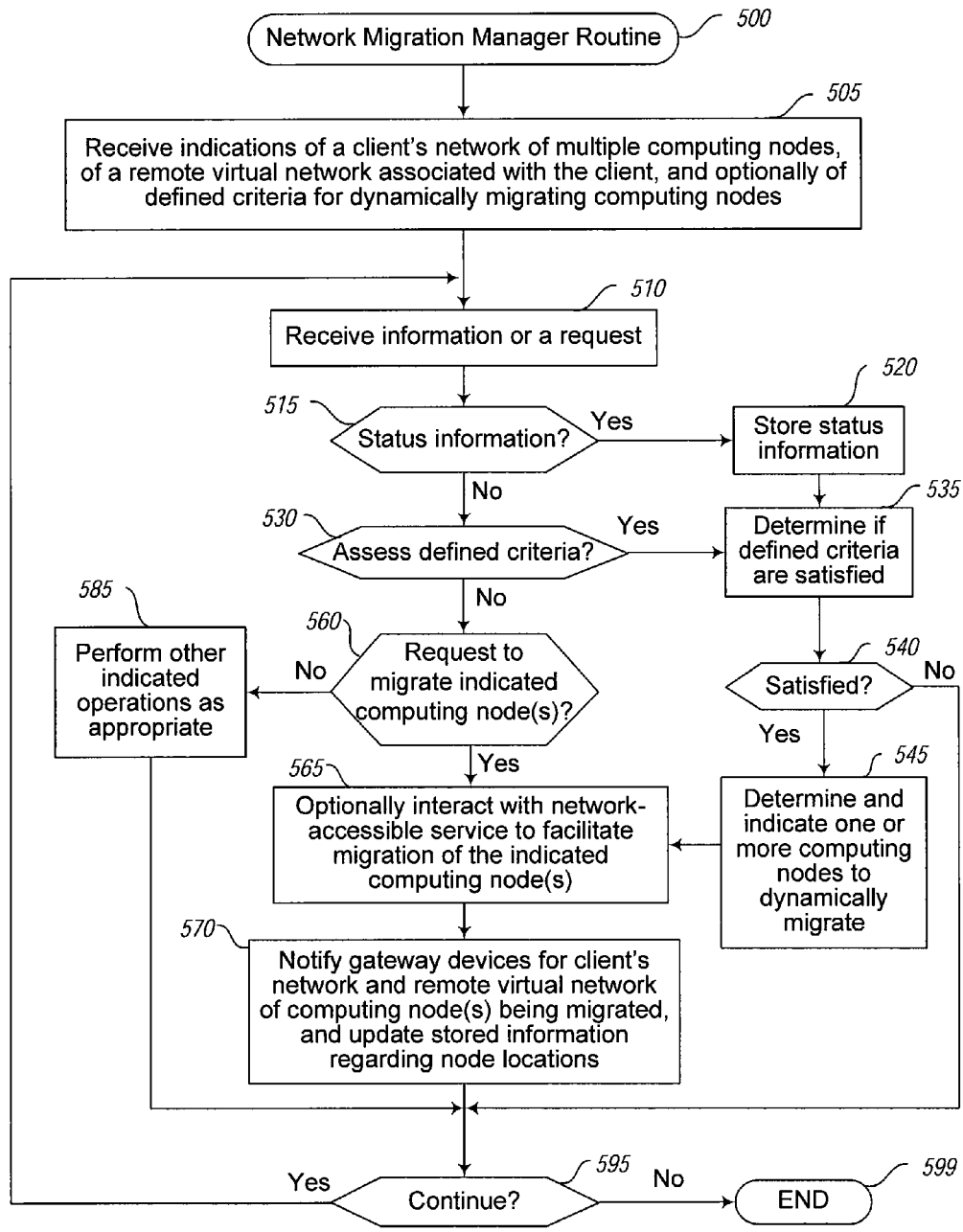
FIG. 5 illustrates a flow diagram of an example embodiment of a Network Migration Manager routine.

FIG. 5 is a flow diagram of an example embodiment of a Network Migration Manager routine 500. The routine may be provided by, for example, execution of the NMM modules 125 and 164 of FIGS. 1A and 1B and/or of the NMM module 340 of FIG. 3, such as to provide capabilities to facilitate dynamic migration of computer network computing nodes. In the illustrated embodiment, each NMM module manages the dynamic migration of computing nodes from an originating network to a destination computer network for a single client at a single time, although in other embodiments a single NMM module may simultaneously manage dynamic migrations of computing nodes for multiple computer networks (e.g., for multiple distinct users or other entities, such as if the NMM module is provided by a configurable network service that provides virtual computer networks to multiple remote clients), and/or may manage dynamic migration of computing nodes back and forth between two or more computer networks such that different computer networks act as the originating and destination computer networks at different times. In addition, in the illustrated embodiment, the routine uses a virtual computer network provided by a network-accessible service (e.g., a configurable network service) as the destination computer network to which computing nodes are migrated, but may interact with other types of computer networks in other embodiments. Furthermore, in the illustrated embodiment, the routine may optionally receive and use various criteria information to assist in the automated selection of particular computing nodes to migrate, but in other embodiments the routine may instead not perform such automated selection (e.g., if the client provides instructions regarding when particular computing nodes are to be migrated). Similarly, in the illustrated embodiment, the routine may optionally participate in the automated migration of particular computing nodes, such as by interacting with the network-accessible service to prepare replacement computing nodes as part of the migration, but in other embodiments the routine may instead not perform such automated migration activities (e.g., if the client performs such migration activities, and notifies the routine when the migration of an indicated originating network computing node to an indicated destination network replacement computing node is completed).

The illustrated embodiment of the routine begins at block 505, where configuration information is received regarding a client's originating computer network from which one or more computing nodes will be dynamically and incrementally migrated to a destination remote virtual computer network, and optionally of defined criteria for use in selection of how and/or when to migrate originating computer network computing nodes to corresponding destination computer network replacement computing nodes. Thus, in the illustrated embodiment, the routine 500 receives information about an existing remote virtual network to use as the destination computer network, although in other embodiments the routine may instead dynamically interact with a remote network-accessible service to create such a remote virtual network on behalf of the client or to otherwise obtain access to one or more remote computing nodes to use as replacement computing nodes for migrated computing nodes.

In the illustrated embodiment, the routine continues to block 510 where it receives a request or information. In block 515, if it is determined that computing status information is received in block 510 related to computing nodes of the originating and/or destination computer networks (e.g., from the client, in response to a request made by the routine in block 585, from information that is pushed to the routine from the network-accessible service and/or from gateway devices and/or from particular computing nodes, etc.), the routine continues to block 520 to store that status information. In the illustrated example, the routine then continues to block 535 to determine if the defined criteria (if optionally provided) are currently satisfied, such as based at least in part on the received status information, although in other embodiments the defined criteria may not be checked each time that status information is received.

If it is instead determined in block 515 that status information is not received, the routine continues instead to block 530 to determine if the information or request received in block 510 is an instruction to assess the optionally provided defined criteria to determine whether to currently select one or more originating computer network computing nodes to migrate to one or more destination computer network replacement computing nodes, such as an instruction from the client, an instruction that is triggered periodically or under specified circumstances, etc. If so, the routine continues to block 535 to assess the defined criteria to determine if one or more of the defined criteria are currently satisfied, such as based at least in part on the previously received status information stored with respect to block 520. As discussed in greater detail elsewhere, such defined criteria may be based on a variety of factors (e.g., the current level of utilization of various originating computer network computing nodes). If it is determined in block 540 that one or more of the defined criteria are satisfied, the routine continues to block 545 to determine one or more particular originating computer network computing nodes to dynamically migrate (e.g., based on the defined criteria; in a manner that is not based on the defined criteria, such as a random manner; etc.), and optionally to determine particular replacement computing nodes to be used for the migration (e.g., based on the defined criteria; in a manner that is not based on the defined criteria, such as any available computing node that is currently part of the destination computer network or that may be dynamically added to the destination computer network; etc.). The routine then continues to block 565 and indicates the determined computing node(s).

If it is instead determined in block 530 that the received request or information is not to assess the defined criteria, the routine continues instead to block 560 to determine if a request or instruction has been received related to migration of one or more indicated originating computer network computing nodes. If so, the routine continues to block 565 to optionally programmatically interact with the remote network-accessible service that provides the destination virtual computer network to facilitate the availability of replacement computing nodes for the migration, such as by adding the replacement computing nodes to the destination computer network, provisioning the replacement computing nodes, etc. In other embodiments and situations, the client may instead manage the actual migration of the indicated originating computer network computing node(s) to indicated replacement computing node(s), and notify the routine 500 of those replacement computing node(s) as part of the information received in block 510, and if so the routine may not interact with the network-accessible service in block 565. After block 565, the routine then continues to block 570 to notify gateway devices on the originating and destination computer networks of the migration of the indicated originating computer network computing node(s) to the corresponding replacement computing node(s) on the destination virtual computer network, so that the gateway devices may facilitate ongoing operations of the originating computer network during the dynamic migration.

If it is instead determined in block 560 that the received request or information is not an indication of migrated computing nodes, the routine continues instead to block 585 to perform one or more other indicated operations as appropriate. For example, other types of operations may include requesting current status information for originating and/or destination network computing nodes (e.g., periodically, upon the occurrence of particular situations, etc.), facilitating a client request to migrate functionality to the destination computer network corresponding to a router device or other device of the originating computer network that is not one of the originating computer network computing nodes, etc. Other operations may also include various types of administrative or housekeeping actions in at least some embodiments and situations.

After blocks 570 or 585, or if the routine instead determines in block 540 that the defined criteria were not satisfied, the routine continues to block 595 to determine whether to continue, such as until an explicit indication to terminate is received. If it is determined to continue, the routine returns to block 510, and if not continues to block 599 and ends.

Figure 4A:
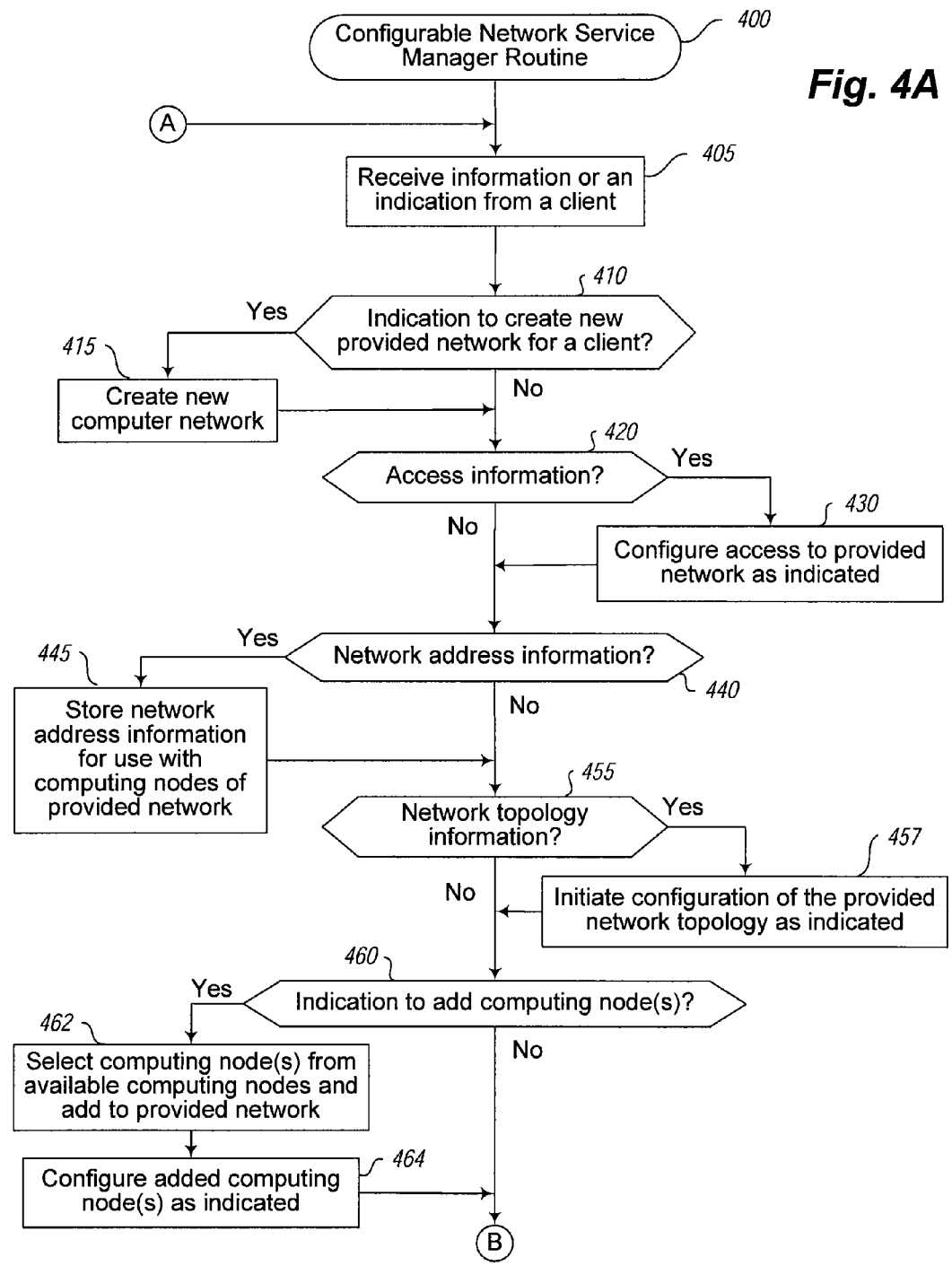
FIGS. 4A and 4B illustrate a flow diagram of an example embodiment of a Configurable Network Service Manager routine.
Figure 4B:
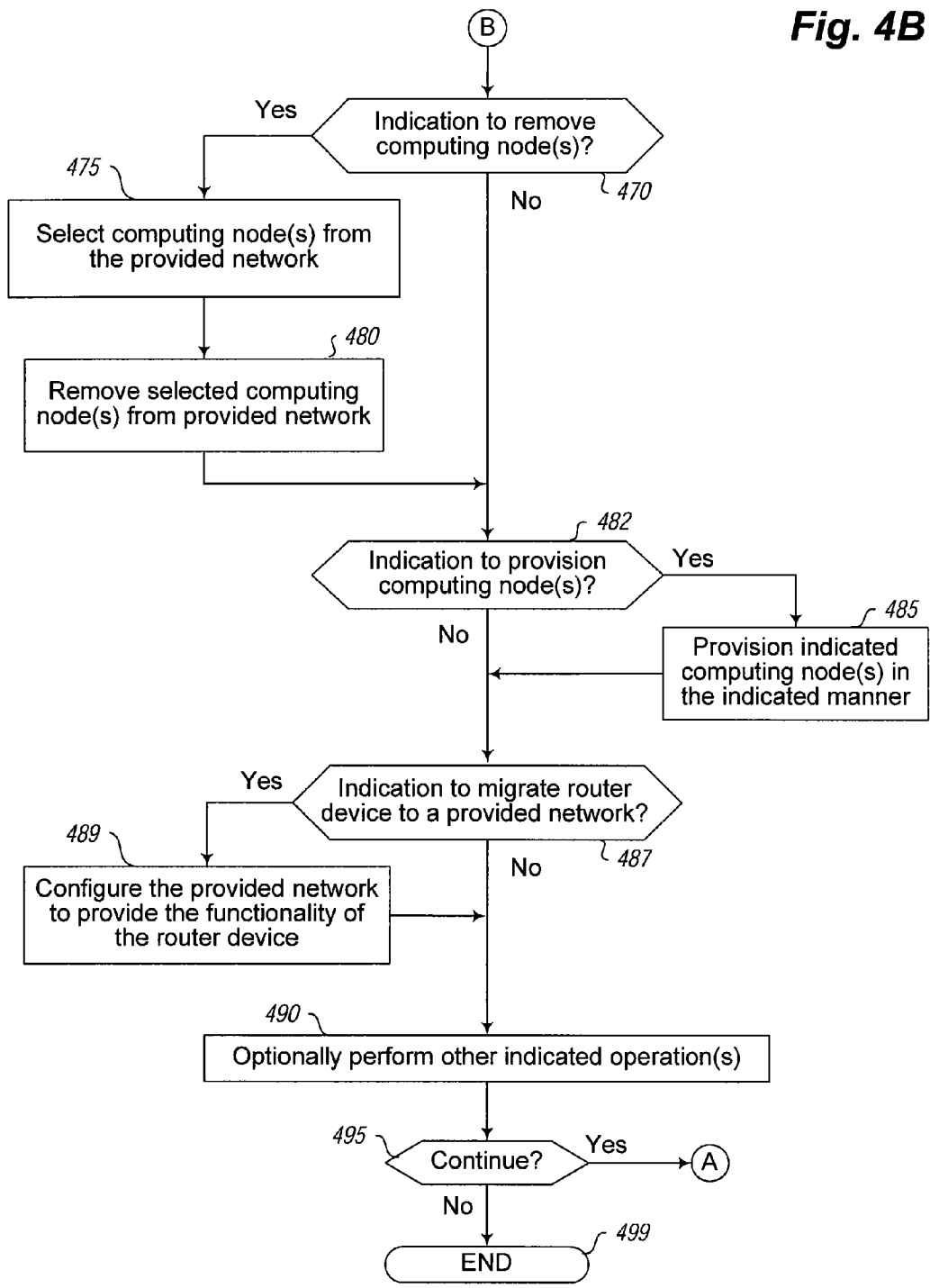

FIGS. 4A and 4B illustrate a flow diagram of an example embodiment of a Configurable Network Service Manager routine 400. The routine may be provided by, for example, execution of the system manager module 110 of FIG. 1A and/or execution of a network-accessible service that uses one or more of the other computing systems 380 of FIG. 3, such as to assist in managing operations of a configurable network service that provides computer networks to remote clients. In the illustrated embodiment, at least some of the computer networks that are created and provided by the routine 400 may be extensions to existing remote networks of clients, while in other embodiments the networks that are created and provided by the routine 400 may instead be standalone networks for use by clients that are not extensions of other networks. In addition, at least some of the provided computer networks may be used by embodiments of the NMM modules to facilitate dynamic migrations of originating computer network computing nodes, as discussed with respect to FIG. 5 and elsewhere.

The illustrated embodiment of the routine begins at block 405, where an indication is received of a message (e.g., from an NMM module or other client) or other information that is received. In at least some embodiments, the configurable network service that the routine 400 supports provides one or more APIs to allow remote clients to programmatically interact with the configurable network service, and if so some or all of the indications received in block 405 may be made via invocations or other programmatic interactions of remote clients with those APIs, while in other embodiments and situations, some or all of the indications received in block 405 may instead be initiated by remote clients or others in other manners.

After block 405, the routine continues to block 410 to determine whether the indication received in block 405 is to initiate the creation of a new virtual computer network to be provided on behalf of a requesting client, such as an extension to an existing remote network of the client. If so, the routine continues to block 415 to perform various actions to create the new computer network extension or other new computer network on behalf of the client. For example, as described in greater detail elsewhere, the received communication to create the new computer network may include various configuration information related to the computer network to be created, such as a number of computing nodes that are to be part of the created computer network, an indication of whether the new computer network is an extension to another remote network, etc. The actions taken in block 415 may include, for example, selecting particular computing nodes that are available from the configurable network service for use in the new computer network that is being created; generating and associating a unique identifier with the new computer network that is being created; storing any received configuration information for later use; etc. As described in greater detail elsewhere, such computing nodes may be selected from a group of available computing nodes in various manners in various embodiments, such as based on capabilities of the selected computing nodes, based on network locations of the selected computing nodes (e.g., on an underlying substrate network of the configurable network service, on a relative network location to other computing nodes of the computer network, etc.), based on geographic locations of the selected computing nodes (e.g., in one of multiple geographically distributed data centers, on a relative geographic location to other computing nodes of the computer network, etc.), in a random manner, etc. Furthermore, while not illustrated here, the routine may provide to the client the unique identifier for the new computer network or other reference for the new computer network, so as to allow the client to later reference the new computer network when performing further configuration of or interactions with the new computer network.

After block 415, or if it is instead determined in block 410 that the indication received in block 405 is not to create a new computer network, the routine continues to block 420 to determine whether the indication received in block 405 includes information related to access constraints or other access information for an indicated computer network. For example, in some situations, a client may supply one or more requests or other messages that are received and processed together with respect to block 405, such as a request to create a new computer network extension and various specified configuration information for that new computer network extension—if so, the indicated computer network for which access information is supplied may be the new computer network extension that was just created with respect to block 415. In other situations and embodiments, a remote client may instead supply different communications at different times that are received and processed with respect to block 405, such as an initial request to create a new computer network, and later one or more other separate requests to specify various types of configuration information for that previously created computer network. If it is determined in block 420 that access information is received in block 405, the routine continues to block 430 to use specified access constraint information for the indicated computer network to configure allowable access for the indicated computer network. As described in greater elsewhere, such configuration information may include constraints as to whether any of the computing nodes of the computer network are allowed to have access to the Internet or otherwise outside the computer network, as well as to optionally specify communication access policies between computing nodes of the computer network (including remote parts of the computer network if the indicated computer network is an extension to a remote computer network). Accordingly, in block 430, the routine takes one or more actions that may include, for example, configuring routing information to be used by communication manager modules of the configurable network service that support the computer network (e.g., by sending a message to those communication manager modules with the information to be configured). Furthermore, if the access information includes instructions to establish a VPN connection from a remote client location to the provided computer network, the actions taken in block 430 may further include taking actions to support such a VPN connection by the provided computer network or otherwise by the configurable network service on behalf of the provided computer network, such as by configuring the provided computer network to accept such a VPN connection and to use appropriate information to decrypt communications that are encrypted for the VPN connection.

After block 430, or if it instead determined in block 420 that the indication in block 405 does not include access information, the routine continues to block 440 to determine whether the indication in block 405 includes network address information for an indicated computer network, such as one or more network address ranges and/or particular network addresses specified in another form. If so, the routine continues to block 445 to store the specified network address information for use with the computing nodes of the indicated computer network, and may further proceed to associate those specified network addresses with the computing nodes of the indicated computer network if those computing nodes have already been selected or otherwise put into use, such as with respect to blocks 415 and/or 462. The associating of specified network addresses with computing nodes of a computer network may further include configuring routing information to be used by communication manager modules that support the computer network, as described in greater detail elsewhere. After block 445, or if it is instead determined in block 440 that the indication received in block 405 did not include network address information, the routine continues to block 455 to determine whether the indication received in block 405 includes network topology information for an indicated computer network. If so, the routine continues to block 457 to store the network topology information for the indicated computer network, and to optionally proceed to configure that indicated computer network in accordance with the network topology information. The configuring of network topology information may include configuring routing information to be used by communication manager modules that support the computer network, such as to simulate actions of virtual networking devices that are part of the specified topology information.

After block 457, or if it is instead determined in block 455 that the indication in block 405 does not include network topology information, the routine continues to block 460 to determine whether the indication in block 405 includes an indication to add computing nodes to an indicated computer network, such as if the indicated computer network has been configured to include a specified quantity of computing nodes but less than that specified quantity have been selected and put into use, or if a specified quantity of computing nodes have not been specified for the indicated computer network. Furthermore, in some embodiments, a client may modify an existing computer network being provided by the configurable network service in various manners even after use of the computer network has been ongoing, including to modify the quantity of computing nodes of the computer network and/or to modify that network topology information for the computer network. As discussed in greater detail elsewhere, the request to add the one or more computing nodes may be received from an NMM module and/or a client as part of the dynamic migration of one or more originating computer network computing nodes to the added computing nodes for use as replacement computing nodes, and may further include an indication of particular network addresses to be used for the added computing nodes (e.g., the network addresses previously used by the originating computer network computing nodes being migrated). If it is determined in block 460 that the indication is to add one or more computing nodes, the routine continues to block 462 to select one or more computing nodes to be added to the indicated computer network from a group of available computing nodes of the configurable network service. As described in greater detail elsewhere, such computing nodes may be selected in various manners. In block 464, the selected computing nodes are then configured for use as part of the indicated computer network, such as in a manner similar to that previously discussed (e.g., by associating appropriate network address information with those selected computing nodes, by setting access rights for those selected computing nodes in accordance with any specified network topology information and/or other access constraint information for the computer network extension, etc.). In addition, in at least some embodiments, the client and/or a NMM module may further provide instructions for provisioning a particular destination computer network computing node to operate as a replacement for an originating computer network computing node that is being migrated, whether at a same time as the adding of the computing node or at a later time, while in other embodiments the client and/or the NMM module may instead directly interact with the destination computer network computing node after it is added to perform such provisioning.

After block 464, or if it is instead determined in block 460 that the indication in block 405 is not to add computing nodes, the routine continues to block 470 to determine whether the indication in block 405 is to remove one or more computing nodes from an indicated computer network, such as from an NMM module and/or a client as part of dynamically migrating a computing node from the indicated virtual computer network to another computer network, so as to remove the migrated computing node(s) after the migration is completed. If it is determined in block 470 that the indication is to remove one or more computing nodes, the routine continues to block 475 to select one or more computing nodes to be removed from the indicated computer network, such as based on an indication of the selected computing nodes in the request, or instead in another manner (e.g., randomly, based on convenience or benefit of the configurable network service, etc.). In block 480, the selected computing nodes are then removed from the computer network.

After block 480, or if it is instead determined in block 470 that the indication in block 405 is not to remove one or more computing nodes, the routine continues instead to block 482 to determine whether the indication in block 405 is to provision one or more computing nodes of an indicated computer network, such as one or more computing nodes just added with respect to block 464, or one or more computing nodes that were previously part of the indicated computer network but used for other purposes (or not currently being used). If so, the routine continues to block 485 to initiate the provisioning of the indicated computing node(s) in the indicated manner, such as to execute one or more indicated software programs on each of the computing nodes, to copy indicated data to the computing nodes, and/or to otherwise prepare the computing nodes to be used in a particular manner. In other embodiments, such provisioning of computing nodes may instead be performed directly by clients of the configured network service based on interactions of the clients directly with those computing nodes.

After block 485, or if it is instead determined in block 482 that the indication in block 405 is not to provision one or more computing nodes, the routine continues to block 487 to determine whether the indication in block 405 is to configure an indicated computer network to provide networking functionality that was previously provided as part of a remote originating computer network that is being migrated to the indicated computer network, such as by a physical router device or other networking device. If so, the routine proceeds to block 489 to configure that indicated computer network in accordance with the indicated networking information, such as in a manner similar to that previously discussed with respect to block 457 and elsewhere. The configuring of the networking functionality may include configuring routing information to be used by communication manager modules that support the indicated computer network, such as to simulate actions of virtual networking devices that correspond to physical networking devices that were part of the originating computer network.

After block 489, or if it is instead determined in block 487 that the indication in block 405 is not to migrate functionality of a networking device, the routine continues to block 490 to optionally perform one or more other indicated operations as appropriate. For example, after completing the configuration of a particular computer network for a client, the routine may further take one or more final steps to provide access to the computer network from remote sources, such as from a remote computer network to which a created new computer network extension belongs. Such providing of access may include, for example, providing information to the client to enable the client to access the computer network (e.g., a publicly accessible network address for a VPN to the computer network), configuring the computer network to accept communications from the remote client, etc. In addition, for at least some provided computer networks (e.g., computer networks used by NMM modules as destination computer networks and/or originating computer networks), the routine may further provide and configure one or more gateway devices, such as in conjunction with VPN connections. After the gateway devices are provided, the NMM modules may interact directly with the gateway devices, or in other embodiments may interact with the routine 400 to configure the gateway devices and/or to obtain status information from the gateway devices. Furthermore, the routine may perform other operations at times (e.g., periodically, when current conditions exceed a specified threshold or otherwise trigger a specified condition, etc.), such as to ping or otherwise check the status of some or all computing nodes for some or all computer networks, monitor the use of some or all computer networks by remote clients, monitor the use of internal configurable network service resources by some or all provided computer networks, establish and maintain accounts of clients with the configurable network service, respond to requests from clients for status information about their accounts or about their provided computer networks, proactively send status information to NMM modules regarding computing nodes that the NMM modules are using, obtain payment from clients for use of the configurable network service, modify the particular computing nodes that are part of an indicated computer network (e.g., by moving one or more executing programs from a computing node at a first geographical location to a new computing node at a second geographical location), etc.

After block 490, the routine continues to block 495 to determine whether to continue, such as until an explicit indication to terminate is received. If it is determined to continue, the routine returns to block 405, and if not continues to block 499 and ends.

Figure 6:
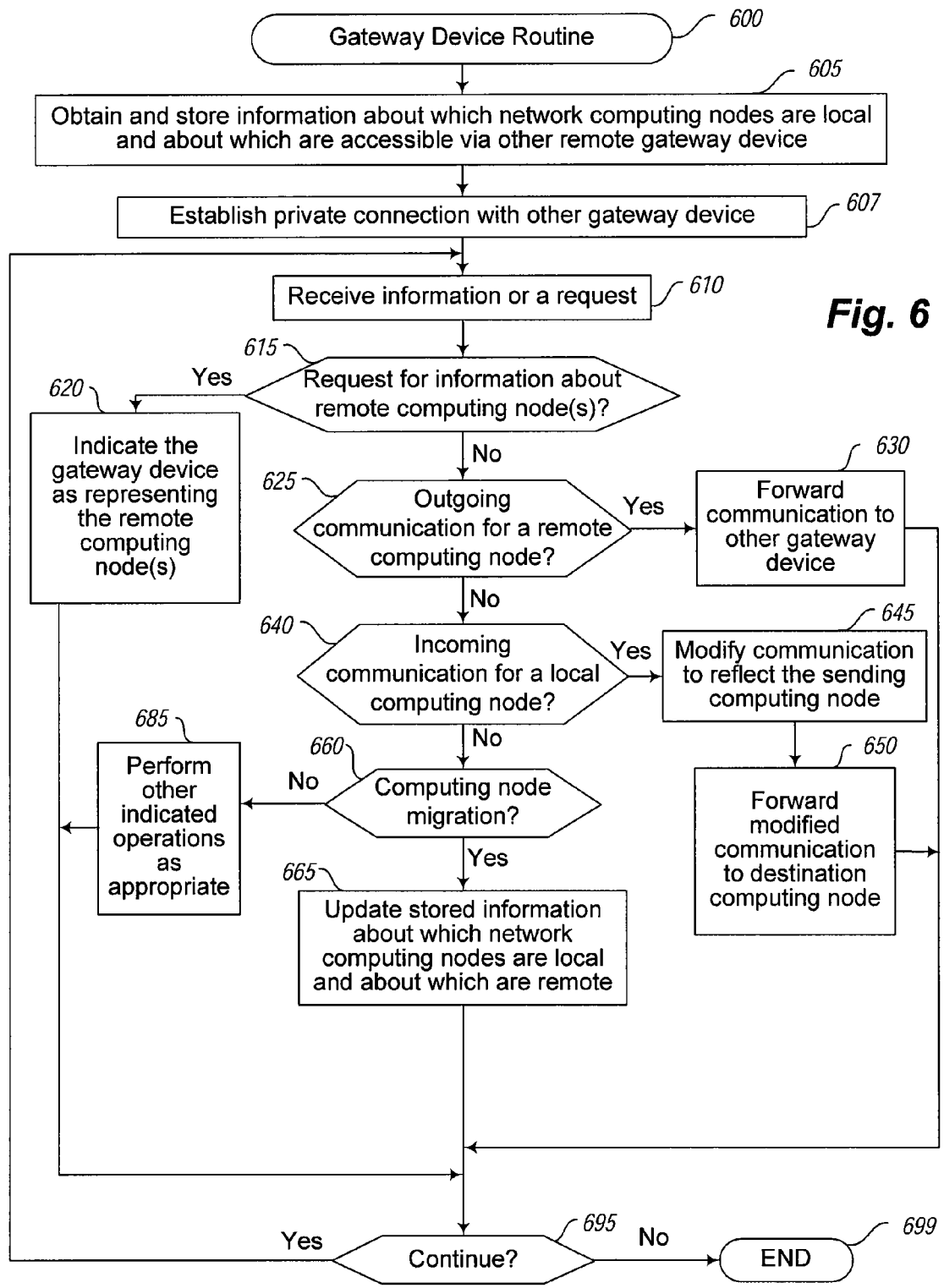
FIG. 6 illustrates a flow diagram of an example embodiment of a Gateway Device routine.

FIG. 6 illustrates a flow diagram of an example embodiment of a Gateway Device routine 600. The routine may be provided by, for example, execution of the gateway devices 122 or 132 of FIG. 1A, gateway device 163 or 192 of FIG. 1B and/or gateway computing devices 370 of FIG. 3, such as to facilitate ongoing operations of an originating computer network that is in use while some or all of its computing nodes are being migrated to a destination computer network. In the illustrated embodiment, the gateway device may be associated with either the originating computer network and destination computer network, and is paired with a corresponding gateway device on the other of the computer networks, but in other embodiments a single gateway device may support both the originating computer network and destination computer network or otherwise two or more computer networks.

The illustrated embodiment of the routine begins at block 605, where an indication is received of configuration information regarding local computing nodes of the computer network to which the gateway device belongs, and regarding remote computing nodes that are associated with a corresponding remote gateway device that is part of a remote computer network. The routine then continues to block 607 to optionally establish a VPN connection or other private connection with the other gateway device if such a connection is not already available.

After block 607, the routine continues to block 610 where it receives a request or information. In block 615, if it is determined that a request is received corresponding to information about a remote computing node accessible via the remote gateway device, the routine continues to block 620 to provide information on behalf of the remote computing node. For example, if the request is an ARP message or other request from a local computing node for information about the location of the remote computing node, the gateway device responds as if the gateway device was the indicated computing node, so that communications intended for the remote computing node will be directed to the gateway device. Similarly, if the request is a ping message or other request for information about the status of the remote computing node, the gateway device may emulate the response that would be provided by the remote computing node and/or interact with the remote computing node to obtain actual information for use in the response. Other types of network messages may be handled in a similar manner.

If it is instead determined in block 615 that a request for information about a remote computing node is not received, the routine continues instead to block 625 to determine if the information or request received in block 610 is an outgoing communication from a local computing node that is intended for a particular remote computing node (e.g., for a replacement computing node at a remote destination computer network that corresponds to a local computing node that was previously migrated). If so, the routine continues to block 630 to forward the communication to the remote gateway device for further forwarding to the intended destination remote computing node, such as in a manner that is transparent to the sending and destination computing nodes. If it is instead determined in block 625 that the received request or information is not a communication intended for a remote computing node, the routine continues instead to block 640 to determine if an incoming communication has been received from a remote computing node via the remote gateway device that is intended for a local computing node (e.g., for a replacement computing node at the local destination computer network that corresponds to a remote computing node that was previously migrated from the remote originating computer network). If so, the routine continues to block 645 to optionally modify the communication to reflect the remote sending computing node, such as to have the modified communication include the network address of the remote sending computing node but the hardware address of the gateway device so that response communications are returned to the gateway device. After block 645, the routine continues to block 650 to forward the modified communication to the local destination computing node over the local computer network.

If it is instead determined in block 640 that the received request or information is not an incoming communication, the routine continues instead to block 660 to determine if the received request or information from block 610 is an indication of a migration of a computing node between the local and remote computer networks. If so, the routine continues to block 665 to update the stored information regarding which computing nodes are local and which are remote for later use in forwarding communications, and may further optionally take one or more actions to update other local computing nodes and/or the remote gateway device of the change (e.g., by issuing a gratuitous ARP on the local computer network, sending a message to the remote gateway device, etc.).

If it is instead determined in block 660 that the received request or information is not an indication of a computing node migration, the routine continues instead to block 685 to perform one or more other indicated operations as appropriate. For example, other types of operations may include providing current status information about local and/or remote computing nodes (e.g., to an NMM module, such as in response to a request or instead periodically or upon the occurrence of particular situations), various types of administrative or housekeeping actions, etc.

After blocks 620, 630, 650, 665 or 685, the routine continues to block 695 to determine whether to continue, such as until an explicit indication to terminate is received. If it is determined to continue, the routine returns to block 610, and if not continues to block 699 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising: forwarding a communication over a first computer network to an intended destination computing node based on a destination network address indicated by the communication, the intended destination computing node being one of multiple computing nodes of the first computer network that are at a first geographical location and that are each associated with one of multiple network addresses of the first computer network;

after the forwarding of the communication, dynamically migrating the first computer network to a remote virtual second computer network at a second geographical location while the first computer network continues to be in use, the dynamic migrating of the first computer network including, for each of the multiple computing nodes of the first computer network:

receiving, by one or more configured computing systems, an indication of migration of the computing node of the first computer network to a distinct replacement computing node at the second geographical location that is part of the remote virtual second computer network, such that after the migration, the distinct replacement computing node of the remote virtual second computer network replaces the migrated computing node as part of the first computer network and uses the network address of the migrated computing node for ongoing operations of the first computer network; and associating, by the one or more configured computing systems, the network address of the migrated computing node on the first computer network with a gateway device on the first computer network that is configured to represent computing nodes of the remote virtual second computer network during the dynamic migrating of the first computer network;

after the migration of a subset of the multiple computing nodes, managing, by the one or more configured computing systems, one or more additional communications sent over the first computer network that each indicate a destination network address used by the distinct replacement computing node for one of the computing nodes of the subset, the managing of each of the additional communications including forwarding the additional communication over the first computer network to the configured gateway device, the additional communication indicating a destination network address used by the replacement computing node for one of the computing nodes of the subset; and forwarding, by the configured gateway device, the additional communication to the remote virtual second computer network for delivery to the replacement computing node for the one computing node of the subset.

2. The method of claim 1 wherein the first computer network is a physical local area network, and wherein the remote virtual second computer network is configured to be an extension to the first computer network such that the computing nodes of the remote virtual second computer network use network addresses for the first computer network that are distinct from network addresses currently in use by the computing nodes of the first computer network.

3. The method of claim 1 wherein the multiple computing nodes of the first computer network are under control of a first entity, wherein the computing nodes of the remote virtual second computer network are under control of a distinct second entity that provides a fee-based configurable network service, and wherein the remote virtual second computer network is configured by the configurable network service to provide networking capabilities for the migrated first computer network that were previously provided by one or more physical networking devices of the first computer network before the dynamic migrating of the first computer network to the remote virtual second computer network.

4. A computer-implemented method, comprising: for each of at least one of multiple computing nodes that are part of a first computer network:

receiving, by one or more computing devices configured to migrate the first computer network to a distinct virtual second computer network, an indication of a migration of the computing node of the first computer network to a distinct replacement computing node of the distinct virtual second computer network, such that after the migration, the distinct replacement computing node of the distinct virtual second computer network replaces the migrated computing node as part of the first computer network and uses a network address of the first computer network that was previously used by the migrated computing node;

associating with a gateway device on the first computer network, by the one or more configured computing devices, the network address used by the distinct replacement computing node, the gateway device being configured to represent the distinct replacement computing node of the distinct virtual second computer network; and managing an additional communication sent over the first computer network to the network address used by the distinct replacement computing node, the managing of the additional communication including forwarding, by the configured gateway device, the additional communication to the distinct virtual second computer network for delivery to the distinct replacement computing node, the additional communication indicating a destination based on the network address previously used by the migrated computing node.

5. The method of claim 4 wherein the at least one computing node of the first computer network includes all of the multiple computing nodes of the first computer network, such that all of the first computer network is incrementally migrated to the distinct virtual second computer network while the first computer network is in use.

6. The method of claim 5 further comprising configuring one or more computing devices associated with the distinct virtual second computer network to provide networking capabilities for the migrated first computer network that were provided by one or more physical networking devices of the first computer network before the incremental migration of the first computer network to the distinct virtual second computer network.

7. The method of claim 4 further comprising, for each of at least one of the distinct replacement computing nodes of the distinct virtual second computer network, automatically facilitating a reverse migration of the distinct replacement computing node back to a target computing node that is part of the first computer network, such that the target computing node replaces the distinct replacement computing node in the first computer network after the reverse migration and uses the network address of the first computer network that was previously used by the distinct replacement computing node, the automatic facilitating including disassociating the network address that was previously used by the distinct replacement computing node with the configured gateway device on the first computer network so that subsequent communications directed to that network address are forwarded via the first computer network to the target computing node.

8. The method of claim 4 wherein the at least one computing node of the first computer network is selected for migration based on at least one criterion selected from a group of criteria including one or more instructions received from a user associated with the distinct virtual second computer network and one or more previously defined criteria for selection of the at least one computing nodes.

9. The method of claim 4 wherein, before migrating one of the at least one computing node of the first computer network to the distinct virtual second computer network, the network address of the one computing node of the first computer network is associated with a second gateway device on the distinct virtual second computer network that is configured to represent the one computing node of the first computer network by forwarding communications directed to that network address to the first computer network.

10. The method of claim 9 wherein the one computing node executes a copy of each of one or more software applications before the migration of the one computing node to the distinct replacement computing node.

11. The method of claim 4 wherein the first computer network includes one or more physically interconnected local area computer networks at a first geographical location and is under control of a first entity, wherein the distinct virtual second computer network is at a remote second geographical location and is under control of a distinct second entity that provides a configurable network service, wherein the first entity is one of the clients of the configurable network service, and wherein the distinct virtual second computer network is one of multiple virtual computer networks provided by the configurable network service.

12. The method of claim 11 wherein the one or more configured computing devices are operated under control of the configurable network service, wherein the configurable network service provides a plurality of computing nodes for use in the virtual computer networks provided by the configurable network service, wherein the at least one computing nodes of the first computer network include two or more of the multiple computing nodes of the first computer network, and wherein, for each of the at least one computing nodes, the distinct replacement computing node for the computing node of the first computer network is a distinct one of the plurality of computing nodes that is selected by the configurable network service and dynamically added to the distinct virtual second computer network on behalf of the first entity, such that the distinct virtual second computer network includes two or more dynamically added computing nodes after the dynamic migrating of the first computer network to the distinct virtual second computer network.

13. The method of claim 12 wherein the distinct replacement computing nodes for the at least one computing nodes are each a virtual machine hosted on one of multiple physical computing systems of the configurable network service, and wherein the dynamic adding of the two or more distinct replacement computing nodes to the distinct virtual second computer network includes configuring one or more virtual machine manager modules that execute on one or more of the physical computing systems to manage communications for the hosted virtual machines so that the hosted virtual machines are included as part of the distinct virtual second computer network.

14. The method of claim 4 wherein, for each of one or more of the at least one computing nodes of the first computer network that are migrated to the distinct virtual second computer network, the migration of the computing node to the distinct virtual second computer network is performed in a manner transparent to other computing nodes of the first computer network, such that the other computing nodes continue to send other communications over the first computer network to destination computing nodes of the first computer network during the migration of the computing node, and such that the destination computing node for at least one of the other communications is the computing node being migrated.

15. The method of claim 4 wherein the one or more configured computing devices include the configured gateway device, and wherein the network addresses of each of the at least one computing nodes of the first computer network are Internet Protocol ("IP") addresses.

16. A non-transitory computer-readable medium whose contents configure one or more computing devices to facilitate dynamic migration of networked computing nodes, by performing a method comprising:
receiving an indication of a migration of a computing node of a first computer network to a distinct computing node of a distinct virtual computer network, such that after the migration, the distinct computing node of the distinct virtual computer network uses network address of the migrated computing node for ongoing operations of the first computer network;
associating the network address of the migrated computing node on the first computer network with a gateway device on the first computer network that is configured to interact with the distinct virtual computer network and to represent the distinct computing node of the distinct virtual computer network; and
managing, by the configured one or more computing devices, each of one or more communications sent over the first computer network to a destination indicated by the network address of the migrated computing node such that the communication will be forwarded to the configured gateway device for further forwarding to the distinct computing node of the distinct virtual computer network.

17. The non-transitory computer-readable medium of claim 16 wherein the first computer network includes multiple computing nodes at one or more first geographical locations, wherein the distinct virtual computer network includes multiple other computing nodes at a second geographical location that is remote from the one or more first geographical locations, wherein the remote virtual computer network is configured to operate as an extension to the first computer network, and wherein, for each of the one or more computing nodes of the first computer network, the distinct computing node of the remote virtual computer network to which the computing node of the first computer network is migrated is one of the other computing nodes and operates as a replacement of the computing node of the first computer network on the remote virtual computer network.

18. The non-transitory computer-readable medium of claim 17 wherein the multiple computing nodes of the first computer network are under control of a first entity, wherein the computing nodes of the remote virtual computer network are under control of a distinct second entity that provides a network-accessible service that enables clients to configure virtual computer networks provided by the network-accessible service on behalf of the clients, wherein the first entity is one of the clients of the network-accessible service, and wherein the remote virtual computer network is one of the virtual computer networks provided by the network-accessible service.

19. The non-transitory computer-readable medium of claim 16 wherein the initiating of the dynamic migration is performed for each of multiple computing nodes of the first computer network so as to incrementally migrate all of the first computer network to the distinct virtual computer network while the first computer network is in use.

20. The non-transitory computer-readable medium of claim 16 wherein the computer-readable medium is a memory of one of the one or more configured devices that stores the contents, and wherein the contents are instructions that when executed cause the one or more configured devices to perform the method.

21. A computing device configured to facilitate dynamic migration of networked computing nodes, comprising:
one or more processors; and
a migration manager module that is configured to, when executed by at least one of the one or more processors, facilitate dynamic migration of one or more computing nodes between distinct first and second local area computer networks while the first and second computer networks are in use, the facilitating of the dynamic migration including, for each of the one or more computing nodes:
receiving an indication of a migration of the computing node from an originating computer network to a distinct destination virtual computer network, the originating computer network being one of the first and second computer networks and the distinct destination virtual computer network being the other of the first and second computer networks, the migrated computing node using an address as part of operations of the originating computer network before the migration and being replaced by a distinct replacement computing node of the distinct destination virtual computer network that uses that address after the migration, such that after the migration, the distinct replacement computing node replaces operations of the originating computer network that were previously performed by the migrated computing node;
and automatically associating the address of the migrated computing node on the originating computer network with a gateway device on the originating computer network that is configured to interact with the distinct destination virtual computer network and to represent the distinct replacement computing node of the distinct destination computer network; and managing each of one or more communications sent over the originating computer network to a destination indicated by the associated address after the migration, the managing of each of the one or more communications including forwarding the communication to the configured gateway device to be forwarded to the distinct replacement computing node of the distinct destination virtual computer network.

22. The computing device of claim 21 wherein the first computer network includes one or more physical computer networks with multiple computing nodes at one or more first geographical locations, and wherein the second computer network includes multiple other computing nodes at a second geographical location remote from the one or more first geographical locations.

23. The computing device of claim 22 wherein the multiple computing nodes of the first computer network are under control of a first entity, wherein the other computing nodes of the second computer network are under control of a distinct second entity, wherein the second entity provides a network-accessible service that enables clients to configure virtual computer networks provided by the network-accessible service on behalf of the clients, wherein the first entity is one of the clients of the network-accessible service, and wherein the second computer network is one of the virtual computer networks provided by the network-accessible service, the second computer network being configured to operate as an extension to the first computer network.

24. The computing device of claim 21 wherein the first computer network includes one or more physical computer networks with multiple computing nodes and wherein the second computer network includes one or more other physical computer networks with multiple other computing nodes.

25. The computing device of claim 21 wherein the originating computer network for each of the one or more computing nodes is the first computer network and the distinct destination virtual computer network for each of the one or more computing nodes is the second computer network, and wherein the facilitating of the dynamic migration is performed for each of the multiple computing nodes of the first computer network so as to incrementally migrate the first computer network to the second computer network while the first computer network is in use.

26. The computing device of claim 25 wherein the addresses used by the one or more computing nodes that are migrated are hardware addresses, and wherein the automatic associating of the hardware addresses of the one or more migrated computing nodes on the originating computer network with the gateway device on the originating computer network includes the gateway device on the originating computer network acting to spoof the hardware addresses of the one or more migrated computing nodes so as to cause communications that are sent over the originating computer network to the hardware addresses of the one or more migrated computing nodes to be directed to the gateway device on the originating computer network.

27. The computing device of claim 25 wherein the addresses used by the one or more computing nodes that are migrated are network addresses, and wherein the automatic associating of the network addresses of the one or more migrated computing nodes on the originating computer network with the gateway device on the originating computer network includes initiating one or more announcements by the gateway device on the originating computer network to cause communications that are sent over the originating computer network to the network addresses of the one or more migrated computing nodes to be directed to the gateway device on the originating computer network.

28. The computing device of claim 21 wherein the migration manager module includes software instructions for execution by the computing device.

29. The computing device of claim 21 wherein the migration manager module consists of a means for facilitating dynamic migration of one or more computing nodes between distinct first and second local area computer networks while the first and second computer networks are in use, the facilitating of the dynamic migration including, for each of the one or more computing nodes:

receiving an indication of a migration of the computing node from an originating computer network to a distinct destination virtual computer network, the originating computer network being one of the first and second computer networks and the distinct destination virtual computer network being the other of the first and second computer networks, the migrated computing node using an address as part of operations of the originating computer network before the migration and being replaced by a distinct replacement computing node of the distinct destination virtual computer network that uses that address after the migration, such that after the migration, the distinct replacement computing node replaces operations of the originating computer network that were previously performed by the migrated computing node; and automatically associating the address of the migrated computing node on the originating computer network with a gateway device on the originating computer network that is configured to interact with the distinct destination virtual computer network such that, for each of one or more communications sent over the originating computer network to that address after the migration, the communication is forwarded to the configured gateway device to be forwarded to the distinct replacement computing node of the distinct destination virtual computer network.

* * * * *

UNITED STATES PATENT AND TRADEMARK OFFICE
CERTIFICATE OF CORRECTION

| | | |
|---|---|---|
| PATENT NO. | : 8,234,377 B2 | Page 1 of 1 |
| APPLICATION NO. | : 12/507742 | |
| DATED | : July 31, 2012 | |
| INVENTOR(S) | : Daniel T. Cohn | |

It is certified that error appears in the above-identified patent and that said Letters Patent is hereby corrected as shown below:

Column 38, Line 29:
"1. A computer-implemented method, comprising: forwarding" should read,
--1. A computer-implemented method, comprising:
forwarding--.

Column 39, Line 34:
"4. A computer-implemented method, comprising: for each" should read,
--4. A computer-implemented method, comprising:
for each--.

Column 41, Line 49:
"virtual computer network uses network address of the" should read, --virtual computer network uses a network address of the--.

Column 42, Line 64:
"and automatically associating the address of the" should read, --automatically associating the address of the--.

Signed and Sealed this
Fourth Day of December, 2012

David J. Kappos
*Director of the United States Patent and Trademark Office*